United States Patent
Tuchman et al.

(10) Patent No.: US 9,760,910 B1
(45) Date of Patent: Sep. 12, 2017

(54) AUTOMATED ADVERTISING AGENCY APPARATUSES, METHODS AND SYSTEMS

(71) Applicant: Quantifind, Inc., Menlo Park, CA (US)

(72) Inventors: Ari Tuchman, Palo Alto, CA (US); John Stockton, Redwood City, CA (US)

(73) Assignee: Quantifind, Inc., Menlo Park, CA (US)

( * ) Notice: Subject to any disclaimer, the term of this patent is extended or adjusted under 35 U.S.C. 154(b) by 270 days.

(21) Appl. No.: 14/105,120

(22) Filed: Dec. 12, 2013

Related U.S. Application Data

(63) Continuation-in-part of application No. 12/496,199, filed on Jul. 1, 2009, now Pat. No. 8,756,229, and a continuation-in-part of application No. 14/043,629, filed on Oct. 1, 2013, application No. 14/105,120, which is a continuation-in-part of application No. 13/252,559, filed on Oct. 4, 2011, now Pat. No. 9,183,203, which is a continuation-in-part of application No. 12/754,249, filed on Apr. 5, 2010, now Pat. No. 8,275,747.

(60) Provisional application No. 61/738,290, filed on Dec. 17, 2012, provisional application No. 61/708,129, filed on Oct. 1, 2012.

(51) Int. Cl.
  *G06F 17/30* (2006.01)
  *G06Q 30/02* (2012.01)
  *G06Q 50/00* (2012.01)

(52) U.S. Cl.
  CPC ......... *G06Q 30/0269* (2013.01); *G06Q 50/01* (2013.01)

(58) Field of Classification Search
  USPC ........................................................ 707/736
  See application file for complete search history.

(56) References Cited

U.S. PATENT DOCUMENTS

| | | | | |
|---|---|---|---|---|
| 8,374,906 | B1* | 2/2013 | Williams | G06Q 30/02 705/400 |
| 8,887,197 | B2* | 11/2014 | Fengg | H04N 21/4788 725/14 |
| 9,081,808 | B1* | 7/2015 | Kiveris | G06Q 30/0251 |
| 9,294,730 | B2* | 3/2016 | Stefanik | G06Q 30/02 |
| 2002/0194070 | A1* | 12/2002 | Totham | G06Q 30/0273 705/14.69 |
| 2007/0027762 | A1* | 2/2007 | Collins | G06F 17/2785 705/14.58 |
| 2007/0157224 | A1* | 7/2007 | Pouliot | H04H 20/14 725/22 |
| 2008/0097811 | A1* | 4/2008 | Kramer | G06Q 10/06 705/7.12 |

(Continued)

*Primary Examiner* — Debbie Le
(74) *Attorney, Agent, or Firm* — Irell & Manella LLP

(57) ABSTRACT

The AUTOMATED ADVERTISING AGENCY APPARATUSES, METHODS AND SYSTEMS ("AAA") provides a platform that, in various embodiments, is configurable to provide advertisement generation and/or placement facilities leveraging real-time or near real-time updating of social media data. The AAA may be configured to automatically direct advertising purchasing, configuration and placement, guide marketing efforts, and implement marketing strategies maximizing target impact. The AAA may further be configurable to forecast financial data, such as revenues, associated with queried products or services, and to direct optimized advertising configuration, purchasing and/or placement.

26 Claims, 37 Drawing Sheets

(56) References Cited

U.S. PATENT DOCUMENTS

| | | | | |
|---|---|---|---|---|
| 2008/0270223 A1* | 10/2008 | Collins | .................. | G06Q 30/02 |
| | | | | 705/14.42 |
| 2009/0228335 A1* | 9/2009 | Niyogi | .................. | G06Q 10/00 |
| | | | | 705/14.66 |
| 2010/0131505 A1* | 5/2010 | Erickson | ........... | G06F 17/30867 |
| | | | | 707/736 |
| 2010/0262464 A1* | 10/2010 | Monteforte | ............ | G06Q 10/00 |
| | | | | 705/7.29 |
| 2011/0078726 A1* | 3/2011 | Rosenberg | ............. | G06Q 30/02 |
| | | | | 725/34 |
| 2011/0191142 A1* | 8/2011 | Huang | ............... | G06Q 30/0204 |
| | | | | 705/7.33 |
| 2013/0024211 A1* | 1/2013 | Monteforte | ........ | G06Q 30/0268 |
| | | | | 705/3 |
| 2013/0085860 A1* | 4/2013 | Summers | ................ | G06Q 30/02 |
| | | | | 705/14.58 |
| 2014/0040018 A1* | 2/2014 | Dellovo | ............. | G06Q 10/0637 |
| | | | | 705/14.45 |
| 2015/0006295 A1* | 1/2015 | Liu | .................... | G06Q 30/0269 |
| | | | | 705/14.66 |

* cited by examiner

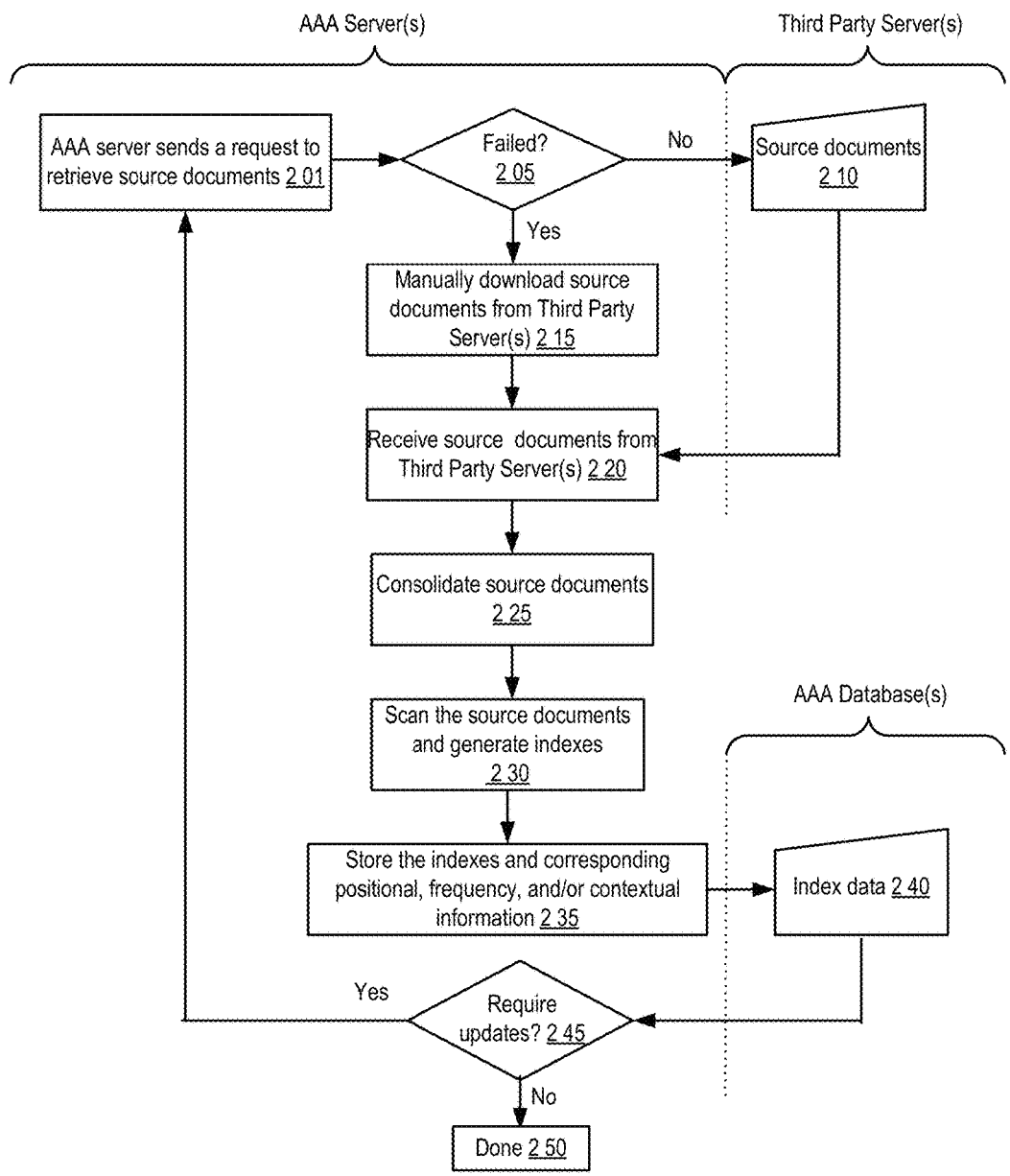
FIGURE 2 — Indexing Process

Query Process

Intent Driver Panel

Intent Driver Interactive Slider

Intent Driver Selection

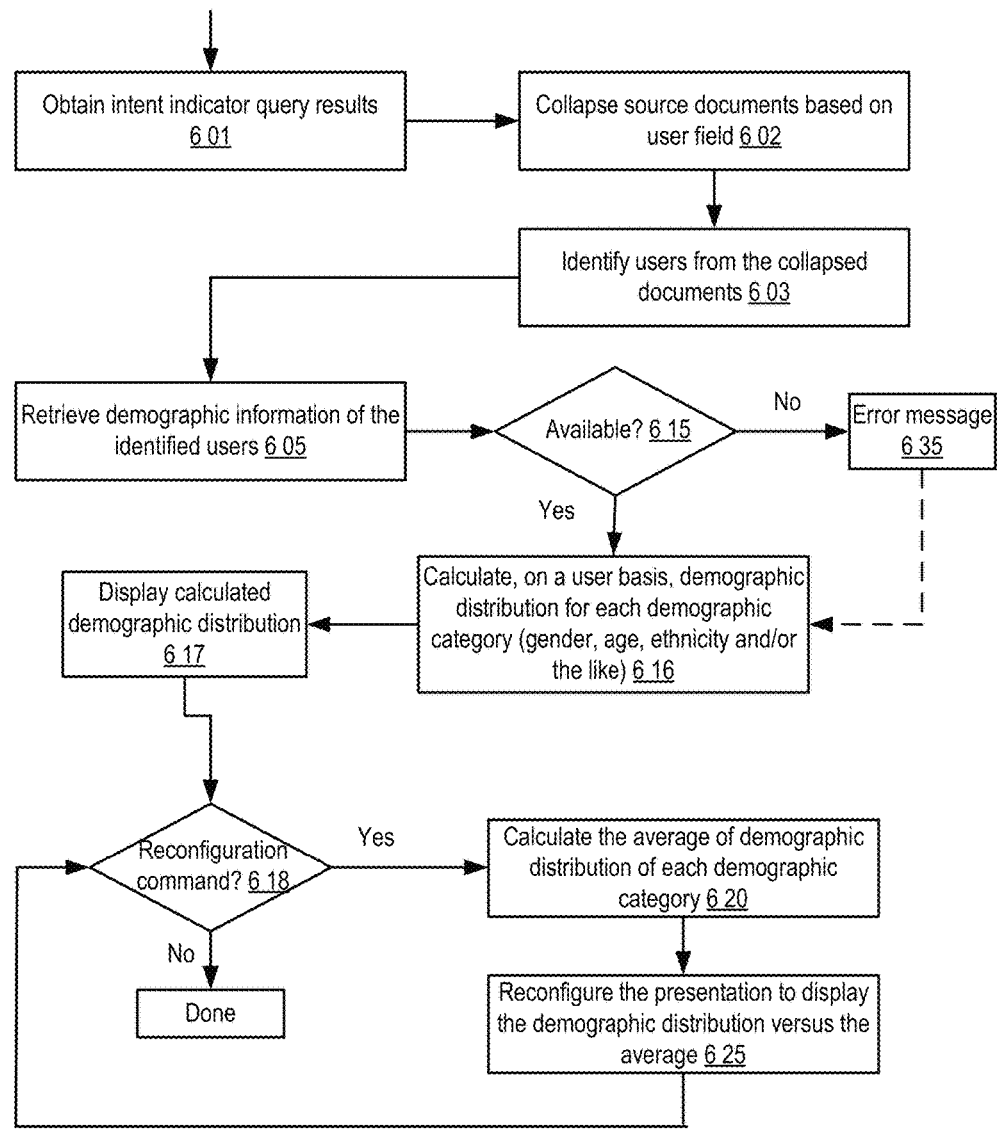
FIGURE 6 — Demographic Panel

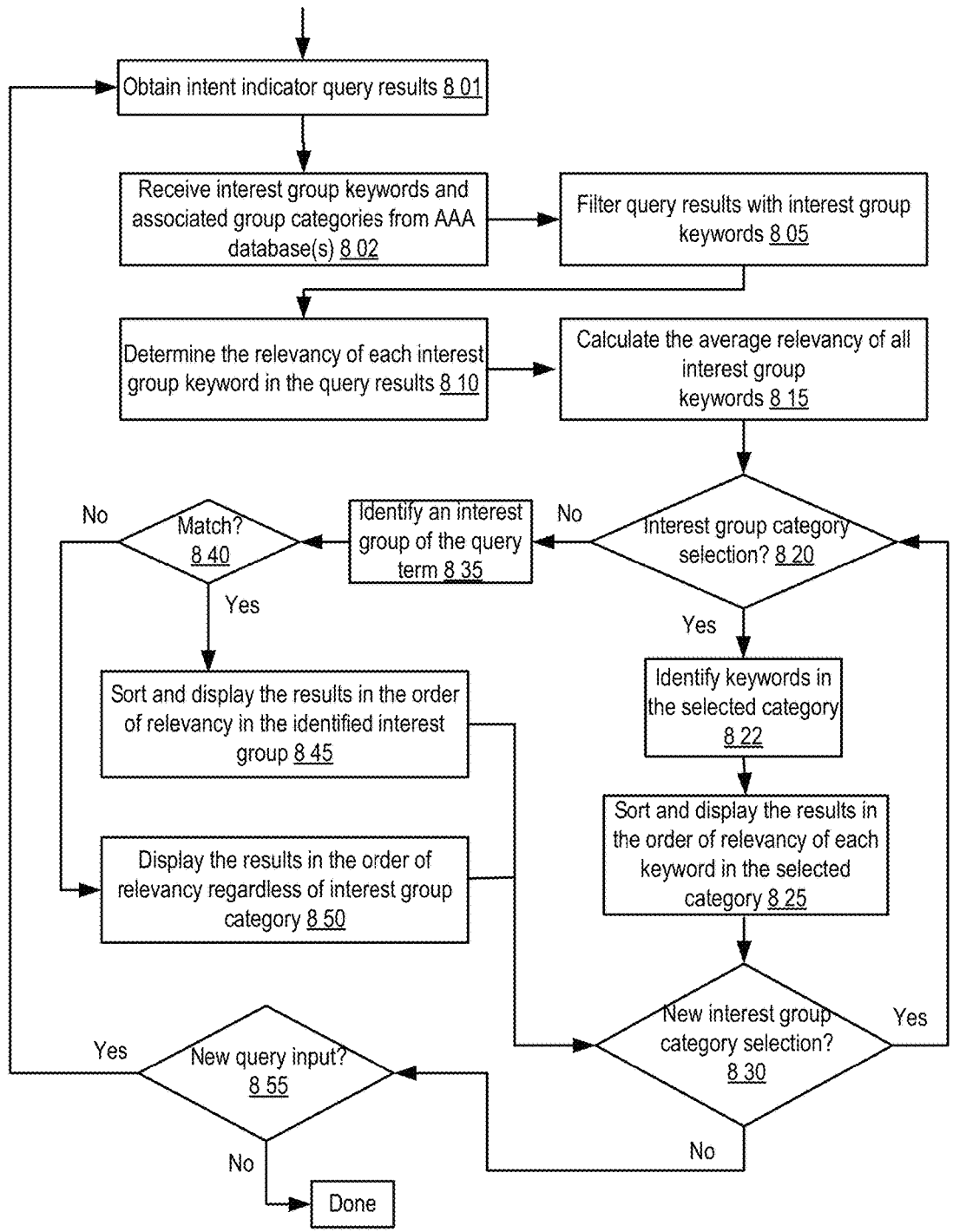
FIGURE 8 — Intent by Interest Group Panel

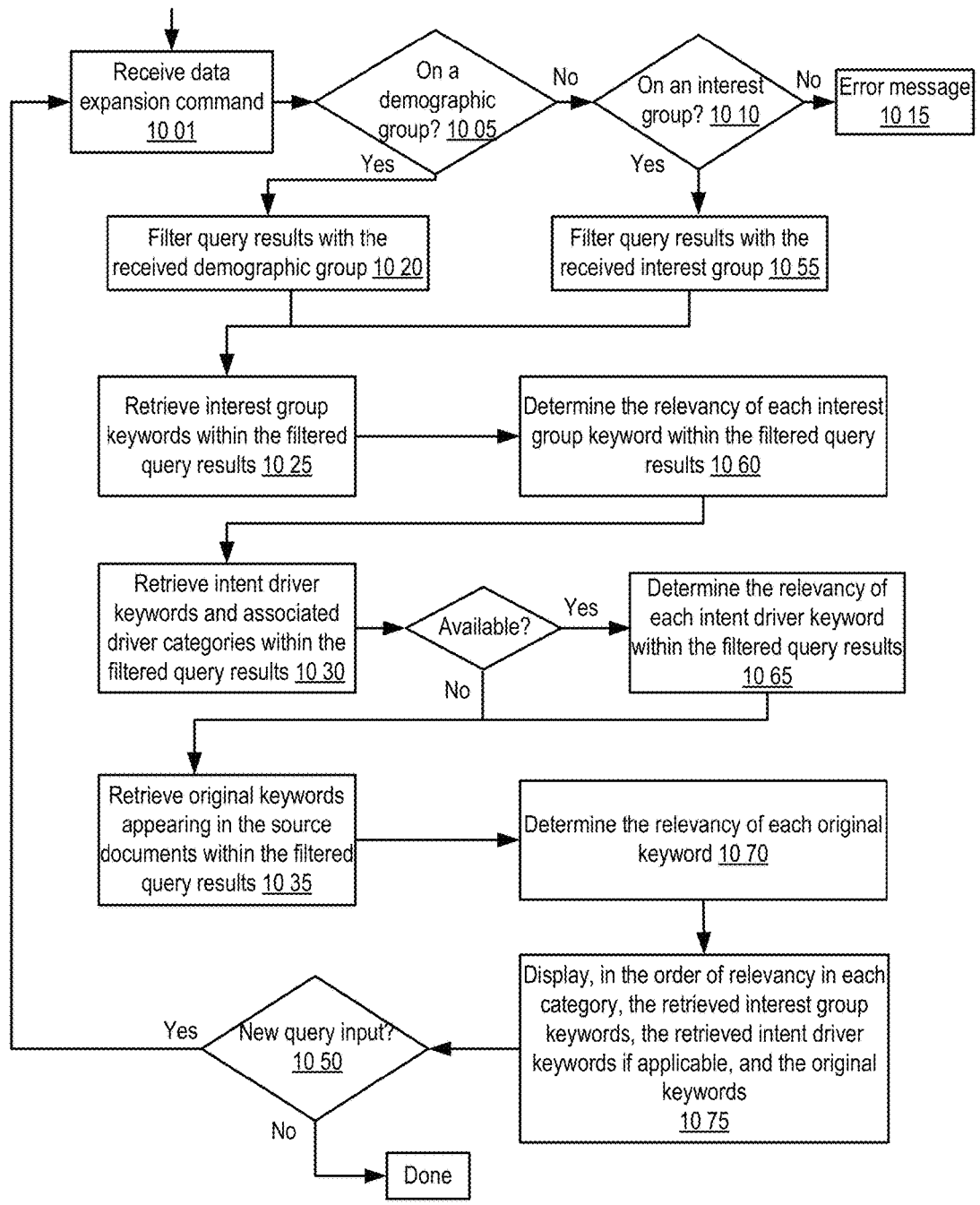
FIGURE 10 Data Expansion Click

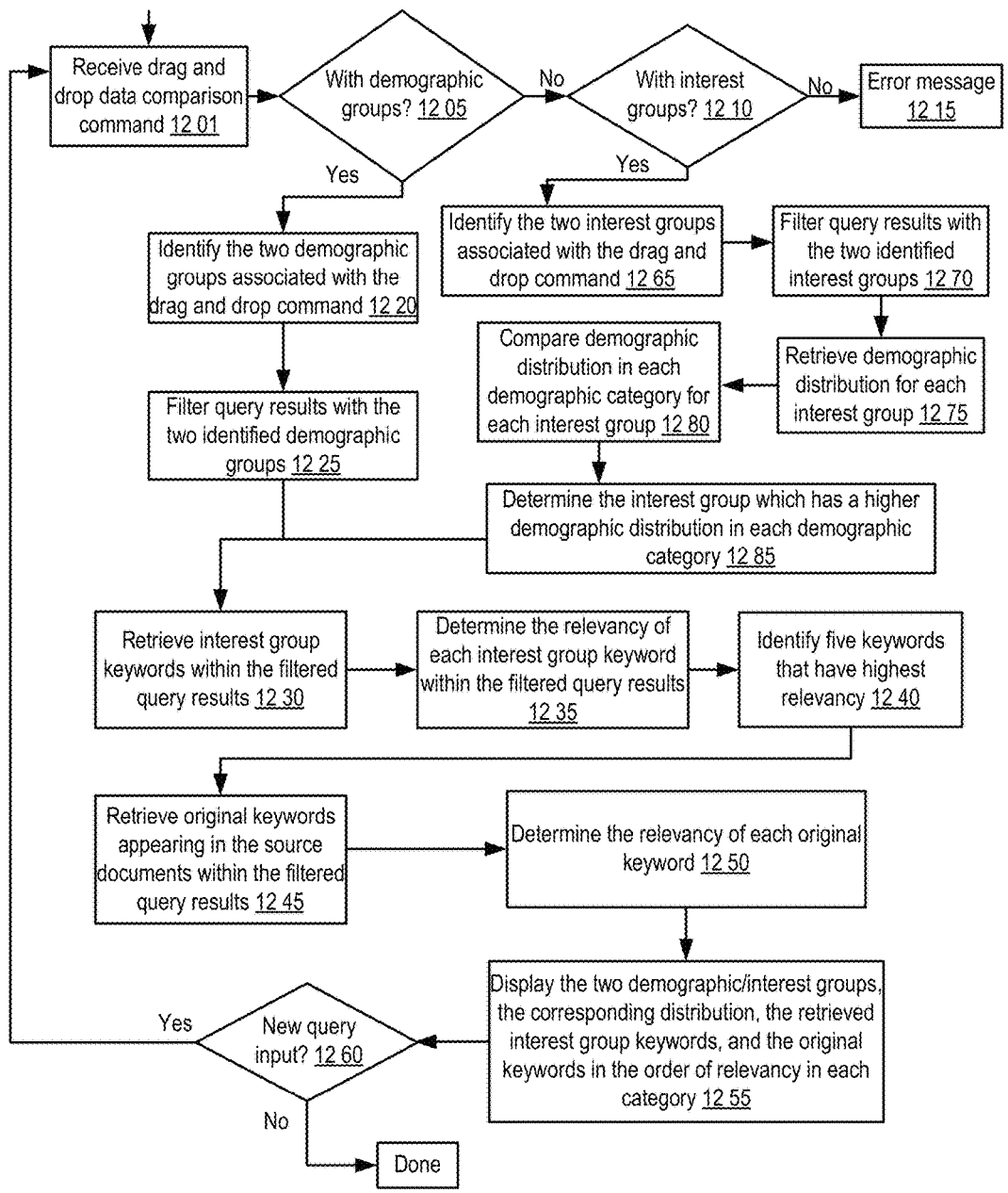
FIGURE 12 — Data Comparison Click

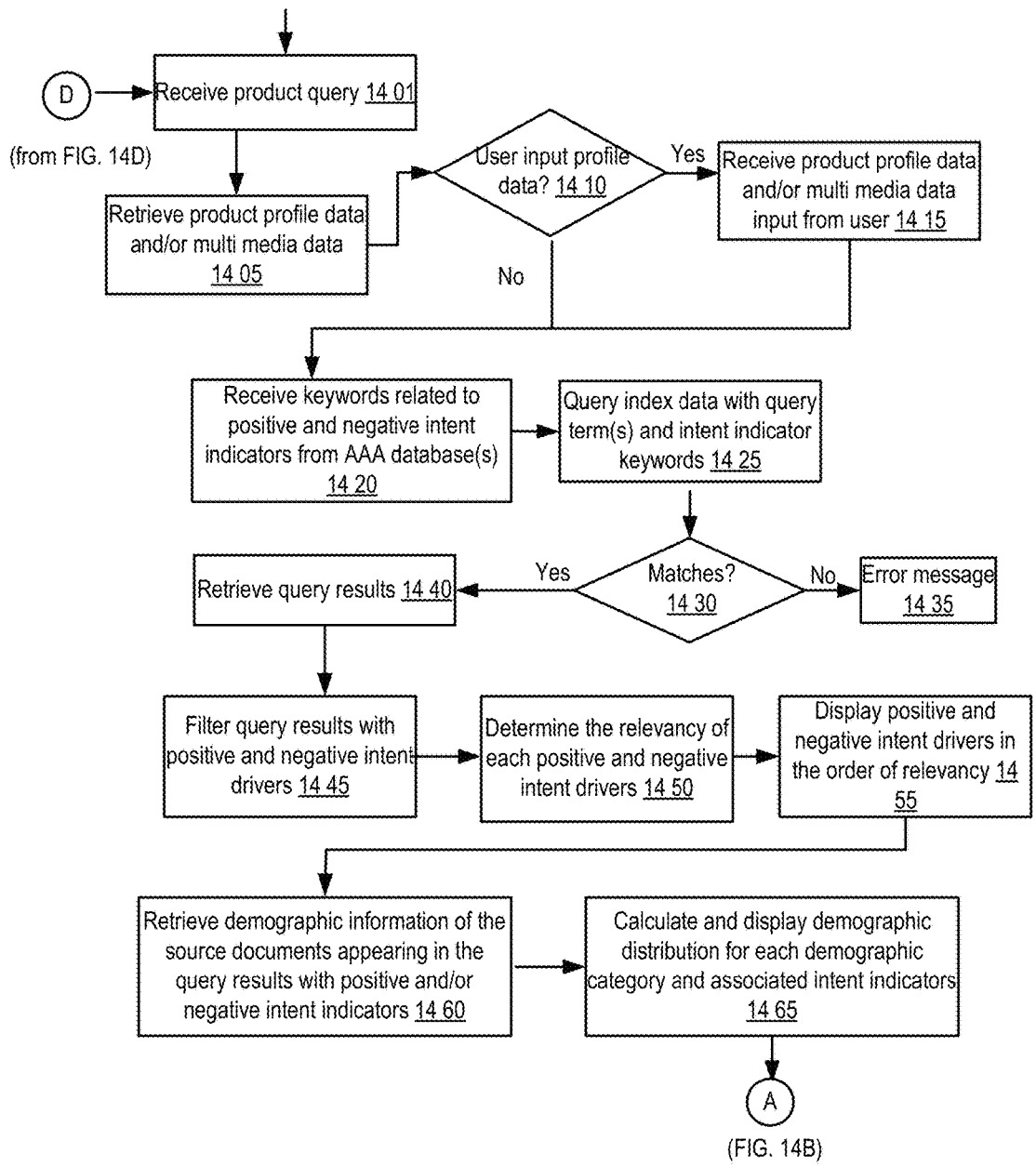
FIGURE 14A  Revenue Forecast

Revenue Forecast

Revenue Forecast

FIGURE 16 — Ad Optimization

AUTOMATED ADVERTISING AGENCY APPARATUSES, METHODS AND SYSTEMS This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIMS AND RELATED APPLICATIONS

This application is a non-provisional of and claims priority under 35 U.S.C. 119 to prior U.S. provisional patent application Ser. No. 61/738,290, filed Dec. 17, 2012, entitled, "Automated Advertising Agency Apparatuses, Methods and Systems"; is a Continuation-In-Part of and claims priority under 35 U.S.C. §120 to co-pending United States non-provisional patent application Ser. No. 12/496,199 entitled, "SYSTEM AND METHOD FOR UNITS-BASED NUMERIC INFORMATION RETRIEVAL," filed Jul. 1, 2009; to co-pending United States non-provisional patent application Ser. No. 14/043,629 entitled, "Market Analytics User Interface Management Apparatuses, Methods and Systems," filed Oct. 1, 2013, which in turn claims priority under 35 U.S.C. §119 to prior United States provisional patent application Ser. No. 61/708,129 entitled, "Market Analytics User Interface Management Apparatuses, Methods and Systems," filed Oct. 1, 2012; and to co-pending U.S. non-provisional patent application Ser. No. 13/252,559 entitled, "GENERALIZED DATA MINING AND ANALYTICS APPARATUSES, METHODS AND SYSTEMS," filed Oct. 4, 2011, which in turn claims priority to prior United States non-provisional patent application Ser. No. 12/754,249 entitled, "AUTOMATED UNIT FINDING FOR NUMERIC INFORMATION RETRIEVAL," filed Apr. 5, 2010 (issued on Sep. 25, 2012 as U.S. Pat. No. 8,275,747).

The entire contents of the aforementioned patents and applications are expressly incorporated herein by reference.

FIELD

The present innovations generally address data analytics and digital advertising, and more particularly, include AUTOMATED ADVERTISING AGENCY APPARATUSES, METHODS AND SYSTEMS.

BACKGROUND

The advent of the internet and mobile device technologies have brought about a sea change in the distribution and availability of information. Ubiquitous electronic communications have resulted in large volumes of information being generated and, often, made widely available. In addition, the rise of social media and networking has allowed users to connect with friends, form groups, and share information on an unprecedented scale.

SUMMARY

The Automated Advertising Agency Apparatuses, Methods and Systems ("AAA") provides a platform that, in various embodiments, is configurable to provide advertisement generation and/or placement facilities leveraging real-time or near real-time updating of social media data. The AAA may be configured to automatically direct advertising purchasing, configuration and placement, guide marketing efforts, and implement marketing strategies maximizing target impact. The AAA may further be configurable to forecast financial data, such as revenues, associated with queried products or services, and to direct optimized advertising configuration, purchasing and/or placement.

BRIEF DESCRIPTION OF THE DRAWINGS

The accompanying appendices and/or drawings illustrate various non-limiting, example, innovative aspects in accordance with the present descriptions:

FIG. 2 shows an implementation of logic flow for indexing in one embodiment of AAA operation;

FIG. 6 shows an implementation of logic flow for an Intent By Demographic Panel in one embodiment of AAA operation;

FIG. 8 shows an implementation of logic flow for an Intent By Interest Group Panel in one embodiment of AAA operation;

FIG. 10 shows an implementation of logic flow for data expansion interaction in one embodiment of AAA operation;

FIG. 12 shows an implementation of logic flow for data comparison interaction in one embodiment of AAA operation;

FIGS. 3A-13F show implementations of user interface for data comparison interaction in one embodiment of AAA operation;

FIGS. 14A-14D show implementations of logic flow for revenue forecasting in one embodiment of AAA operation;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

AAA

The AUTOMATED ADVERTISING AGENCY APPARATUSES, METHODS AND SYSTEMS (hereinafter "AAA") provides a platform that, in various embodiments, is configurable to provide interactive user interfaces reflecting market analyses and strategic planning, and to leverage real-time or near real-time updating of social media data to automatically direct advertising purchasing, configuration and placement, guide marketing efforts, and/or the like.

This disclosure details aspects of AAA. In various embodiments, the AAA may facilitate a wide variety of different uses, such as but not limited to: retrieving numerical and/or non-numerical data, trends, relationships, and/or the like from a corpus of structured and/or unstructured electronic documents; identifying similarities and/or differences for selected characteristics related to query terms; pattern-based searching and/or query refinement based on graphical interface selections; open-ended and/or endpoint-constrained traversal-mode searching; highlighting and/or suppressing outliers and/or deviations from trends, averages, means, external data, and/or the like; alerts and/or associated actions based on occurrence of data points, trends, patterns, and/or the like; discrimination of relationships, trends, patterns, and/or the like; quantitative sentiment analysis; anonymization; automated optimization and/or refinement of search results based on result trends and/or patterns; and/or the like.

It is to be understood that, depending on the particular needs and/or characteristics of a AAA user, document corpus, data resource, system architecture, processor capability, data transmission capability and/or network framework, and/or the like, various embodiments of the AAA may be implemented that facilitate a great deal of flexibility and customization.

The instant disclosure discusses embodiments primarily within the context of electronic document and data feed analysis, information retrieval and user interface presentation. However, it is to be understood that the systems described herein may be readily configured and/or customized for a wide variety of other applications and/or implementations. For example, aspects of the AAA may be configured for analyzing form inputs, images, detected and/or recorded sounds, and/or the like; facilitating natural language queries; result quality analysis and/or diagnostics; and/or the like. It is to be understood that the AAA may be further adapted to other implementations and/or data analysis and presentation applications.

Figure 1:
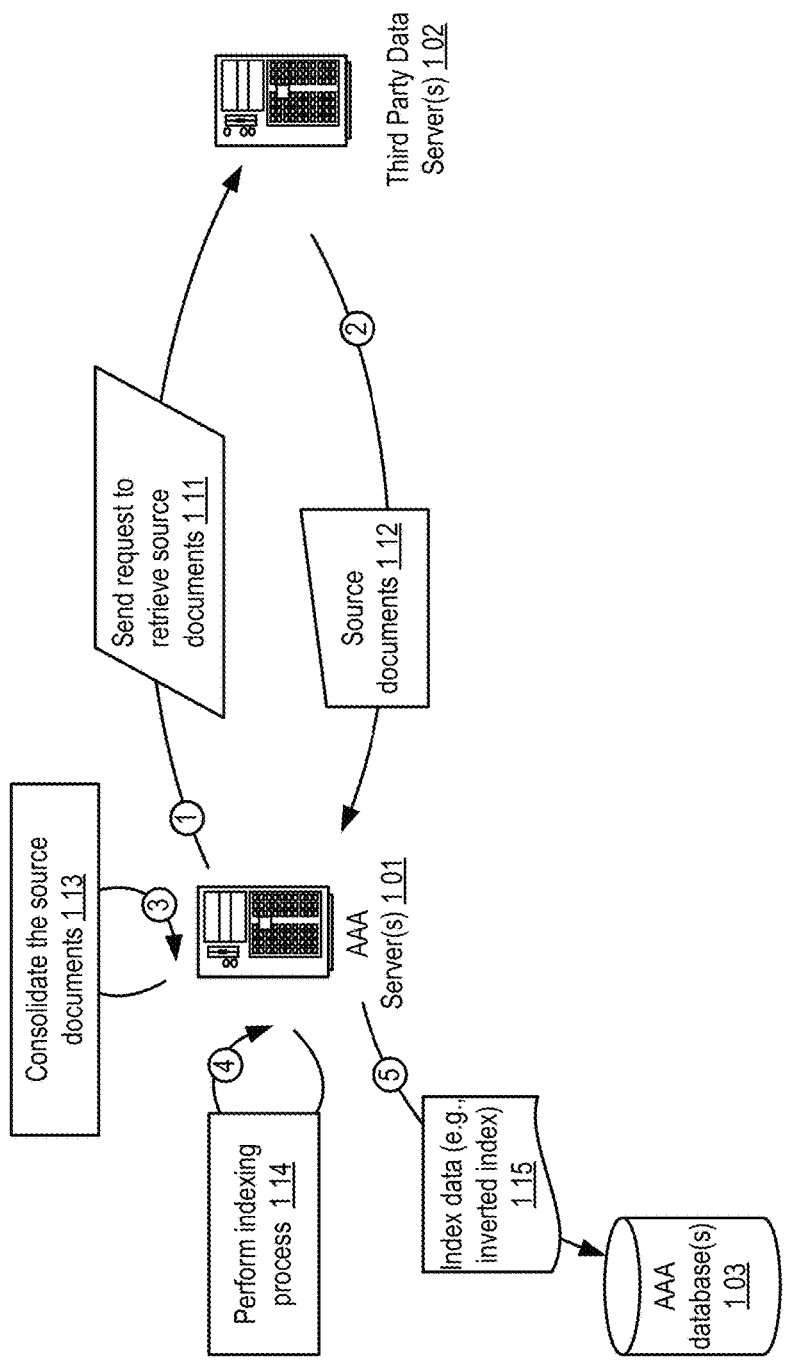
FIG. 1 shows an implementation of data flow for data indexing between and among AAA components and/or affiliated entities in one embodiment of AAA operation.

FIG. 1 shows an implementation of data flow for indexing between and among AAA components and/or affiliated entities in one embodiment of AAA operation. In some implementations, a AAA server 101 may send a request to a third party data server 102 (e.g., social networking sites, blogs, wilds, forums, hosted services, Web 2.0 websites, and/or the like) to retrieve source documents 111, such as via one or more commands associated with an application programming interface ("API") associated with each service and/or third party data server. In response, the third party data server(s) may provide the source documents 112 to the AAA server. The source documents may include structured and/or unstructured data based on a corpus of electronic documents. The AAA server may consolidate the source documents 113, perform an indexing process 114, and store the index data (e.g., inverted index, suffix tree, citation index, Ngram index, document-term matrix, and/or the like) 115 to a AAA database. In some implementations, the index may be updated in real-time, such as based on monitored web service analytics and/or social network chatter (e.g., Facebook status updates, Twitter feeds, Google trends data, and/or the like). The indexing process may include parsing and storing data to facilitate fast and accurate information analysis and retrieval. In some implementations of indexing, machine-learning may be utilized to generate the index. Keywords from each source document may be stored with positional information, such as the page on which a keyword appears, the absolute position (e.g., coordinates) where the keyword appears within a page, the relative position of the keyword in relation to other words in the page, and/or the like. Various metadata, including location, user profile, timestamp, and/or the like, of the source documents may be stored. Contextual tags may be generated, such as based on natural language processing techniques applied to document content, and/or one or more expert knowledge libraries may be utilized to optimize the index. Further detail regarding some embodiments of the generation, structure and application of the indexing process and the index data is provided in application Ser. No. 12/496,199 filed Jul. 1, 2009, entitled, "SYSTEM AND METHOD FOR UNITS-BASED NUMERIC INFORMATION RETRIEVAL," application Ser. No. 12/754,249 filed Apr. 5, 2010, entitled, "AUTOMATED UNIT FINDING FOR NUMERIC INFORMATION" (issued on Sep. 25, 2012 as U.S. Pat. No. 8,275,747) and application Ser. No. 13/252,559 filed Oct. 4, 2011, entitled, "GENERALIZED DATA MINING AND ANALYTICS APPARATUSES, METHODS AND SYSTEMS," all of which are incorporated in their entirety herein by reference.

FIG. 2 shows an implementation of logic flow for an indexing process in one embodiment of AAA operation. In some implementations, the AAA server may send a request to retrieve source documents 201 from the third party data server. In response to the request, the third party server may provide the source documents 210 to the AAA server automatically. In various implementations, the request may be general or may include narrowing constraints, such as one or more keywords, category designations, and/or the like criteria to limit or narrow the body of documents requested In one implementation, the AAA server may send the request periodically to have up-to-date source documents. In another implementation, new source documents and/or changes to existing source documents may be sent to the AAA server in real time and/or near real-time. In some implementations, if the AAA server fails to retrieve the source documents automatically from the third party server 205, the administrator and/or user of the AAA may manually download the source documents 215. Upon receiving the source documents 220, the AAA server may consolidate the documents, scan the documents to generate index 230, and store 235 the index data with corresponding positional, frequency, contextual information, and/or the like 240. In some implementations, the AAA may determine if the system requires updates of the source documents 245. If not, the indexing process of the AAA may end 250. If the system is configured to check for updates of the source documents, the AAA server may proceed to send a new request to the third party server to obtain updates of the source documents.

Figure 3A:
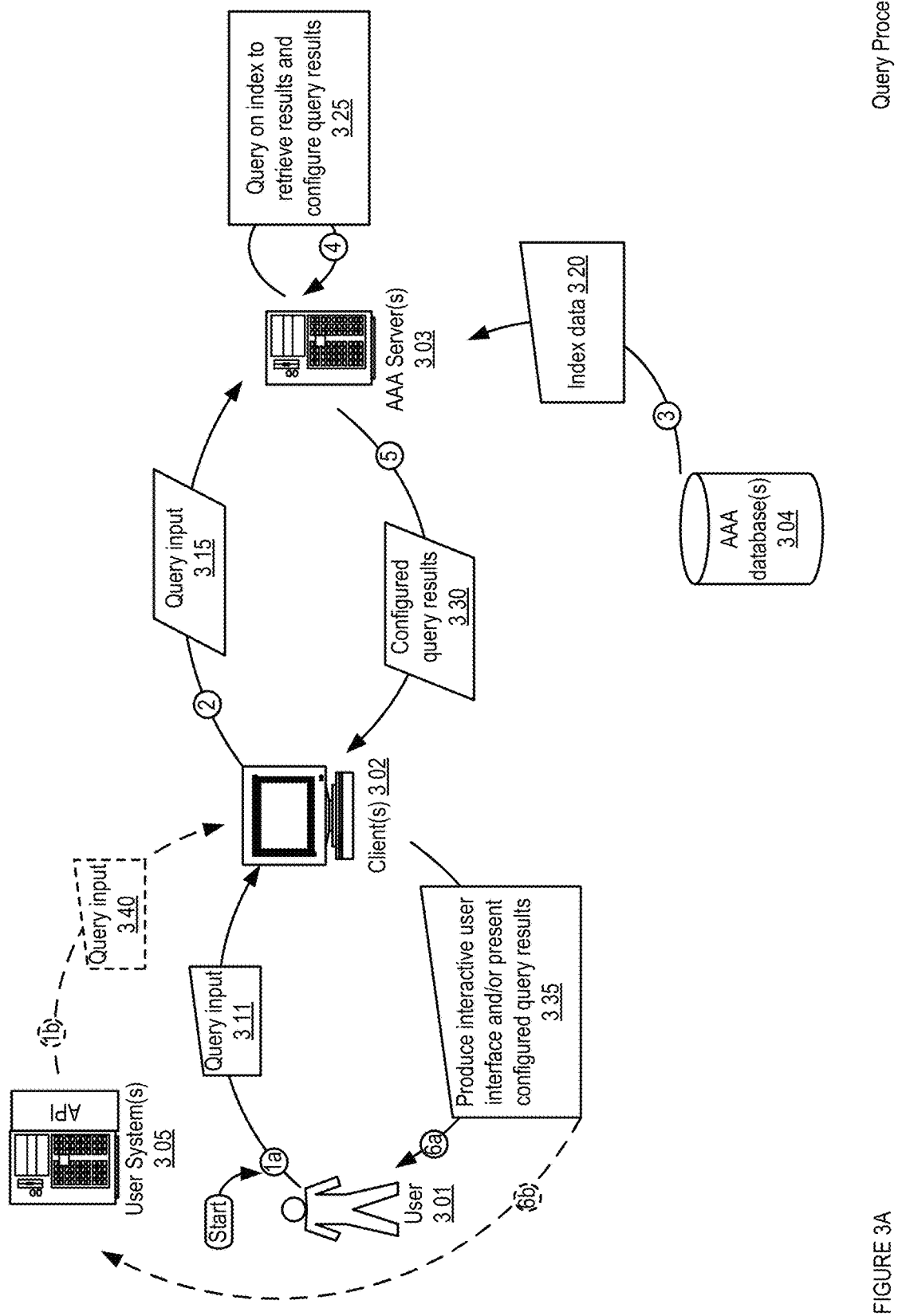
FIG. 3A shows an implementation of data flow for querying between and among AAA components and/or affiliated entities in one embodiment of AAA operation.

FIG. 3A show an implementation of data flow for a query process between and among AAA components and/or affiliated entities in one embodiment of AAA operation. In some implementations, a user 301 may retrieve information by engaging a client device 302 and entering one or more query inputs 311. In some implementations, a query does not originate with an actual user. For example, a user system 305 may automatically identify a query input 340. In one implementation, the user system may push the identified query input to the client device through Application Programming Interface ("API") calls. A query input 311 may include, for example, a keyword, numerical value, a text string, data pattern, a data feed, an audio feed, a video feed, and/or the like. The query term does not have to match exactly to the object. For example, if the user intends to retrieve results related to a particular film he may enter a partial term related to the film, such as all or some of the title, one or more actors involved with the film, a film studio, description, and/or the like as the query term or terms. The AAA may, through machine learning and/or natural language techniques, return the correct results or a list of highly related results to the user. In some implementations, the query input (whether generated by an actual user or a user system) may comprise multiple keywords, entities, patterns, and/or the like which may be analyzed in combination with one or more Boolean relationships between the terms and/or may be analyzed individually in parallel, for which different results may be presented for each term. The query input may then be transmitted 315, such as via a communications network, to one or more AAA servers 303, which may, in turn access one or more AAA databases 304 to retrieve at least one index 320, which may be selected based on the query input 311. A query statement may be constructed based on the query input 311 and used to query the at least one index to generate query results 325, which may then be communicated to the client device 330. The generated query results may be configured to be presented in AAA user interface ("UI"), which may then be provided to the user and/or the user system 335.

Figure 3B:
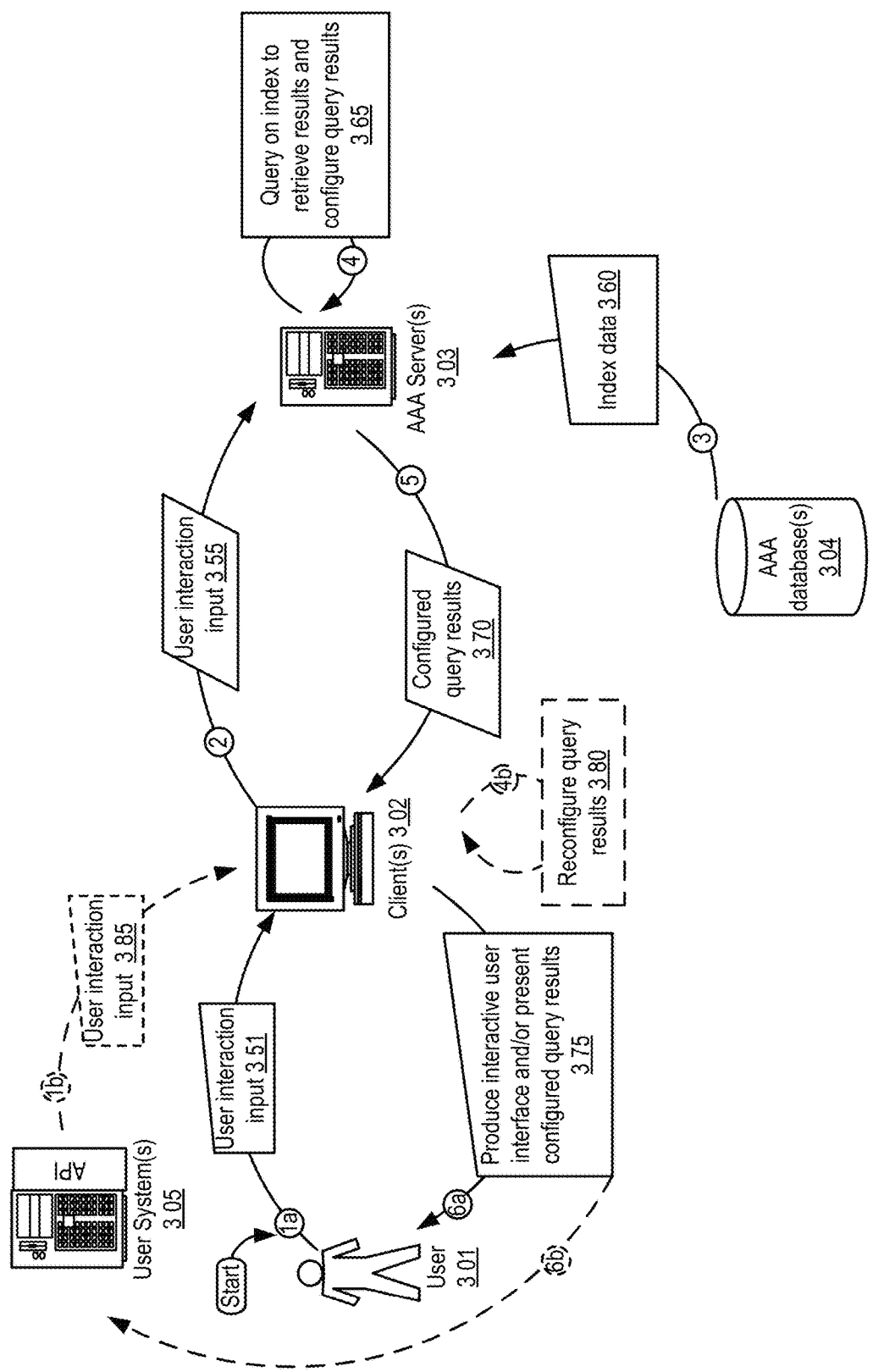
FIG. 3B shows an implementation of data flow for user interaction between and among AAA components and/or affiliated entities in one embodiment of AAA operation.

FIG. 3B shows an implementation of data flow for user interaction between and among AAA components and/or affiliated entities in one embodiment of AAA operation. In some implementations, a user 301 may submit a user interaction input 351, such as selection of a presentation type, reconfiguration of display options, and/or the like, to the client device 302, which may then be transmitted 355 to the AAA server 303. In some implementations, the user system 305 may automatically generate user interaction input 385, which may be pushed to the client device 302 through API calls. The AAA server may, in turn access one or more AAA databases 304 to retrieve at least one index 360, which may be selected based on the user interface input 351. A new query statement may be constructed based on the query input 311 and the user interaction input 351 and used to query the at least one index to generate new query results 365, which may then be communicated to the client device 370. The generated new query results may be reconfigured for presentation via a AAA user interface, which may then be provided to the user and/or the user system 375. In an alternative implementation, the query results 330 based on the query input 311 may be stored in the client device 302. Upon receiving the user interaction input 351, the client device may reconfigure the query results 380 and provide the reconfigured query results to the user.

Figure 4A:
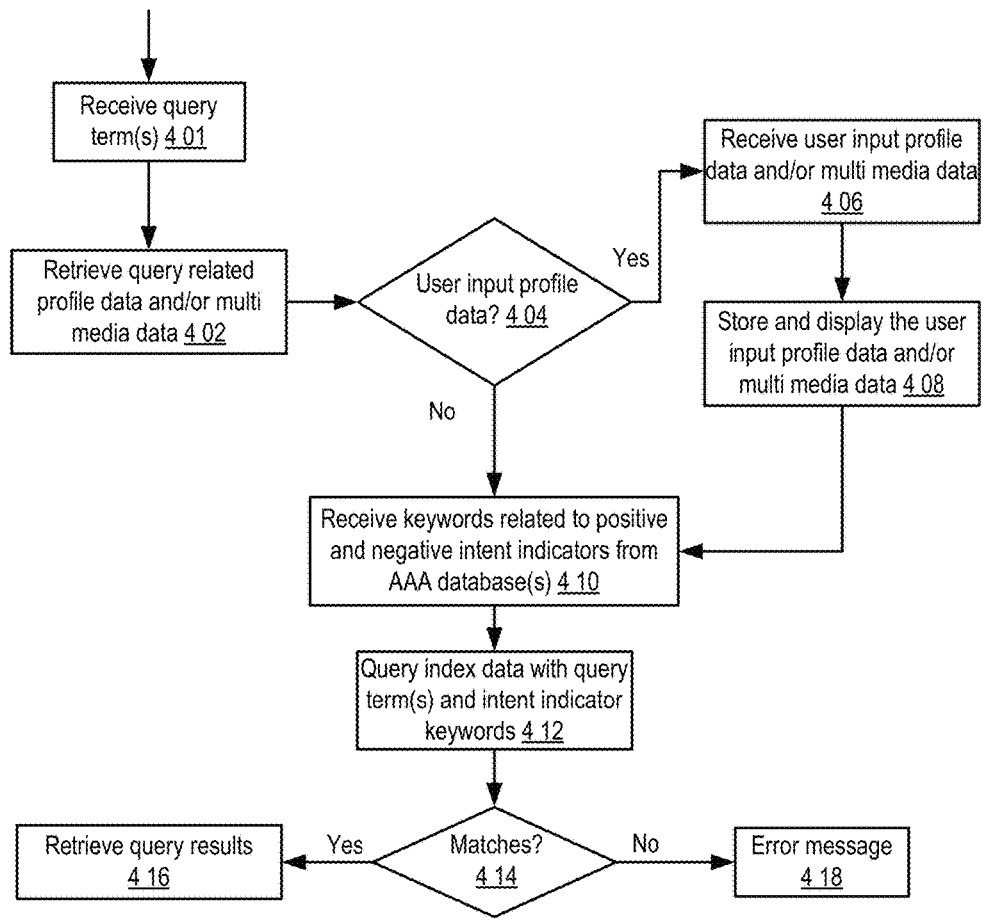
FIG. 4A shows an implementation of logic flow for intent querying in one embodiment of AAA operation.
Figure 5A:
FIGS. 5A-5B show implementations of user interface for an Intent Driver Panel in one embodiment of AAA operation.

FIG. 4A shows an implementation of logic flow for an intent query process in one embodiment of AAA operation. In some implementations, query terms may be received 401, such as but not limited to: keywords, numerical values, text strings, data trends, data patterns, data feeds, audio feeds, video feeds, and/or the like. In one implementation, the AAA may retrieve profile data and/or multi-media data related to the query term. In one implementation, the AAA may access the AAA database to retrieve the data. In an alternative implementation, the AAA may send the retrieval request to a server. The server may or may not be the third party server where the source documents are retrieved. For example, as illustrated in FIG. 5A, if the query term received at 401 is related to a particular movie, the AAA may retrieve the profile data 501 and the poster image 502 related to that movie and display them in the AAA user interface. The query term does not have to match exactly to the object. For example, the user may enter partial terms as the query term, or other descriptive terms as the query terms. The AAA may, such as through machine learning and natural language techniques, return a list of direct or highly related results to the user. Returning to FIG. 4A, if the profile data and/or multi-media data related to the query term are needed from the user 404, the AAA may receive corresponding data input from the user 406, which may then be stored and displayed 408.

In some embodiments, the AAA may access the AAA database to retrieve keywords associated with positive and/or negative intent indicators 410. For example, the positive intent indicators may be "I want to watch Movie ABC," "I am going to watch the new ABC movie this weekend," and/or the like. The negative intent indicators may be "I do not want to watch Movie ABC, "I will never watch an ABC movie again," and/or the like. Keywords associated with the positive and/or negative intent indicators may be generated using natural language processing, machine learning, table look-ups, rule-based analysis, and/or the like techniques. A query statement based on the query term and the intent indicator keywords may be constructed and used to query the index 412. If matches are identified 414, query results are generated 416. If matches are not identified, the AAA may generate an error message 418 notifying the user. In one implementation, the AAA may provide an option to the user to revise the query term. In another implementation, the AAA may retrieve updated source documents from the third party server and determine if new matches are identified.

Figure 4B:
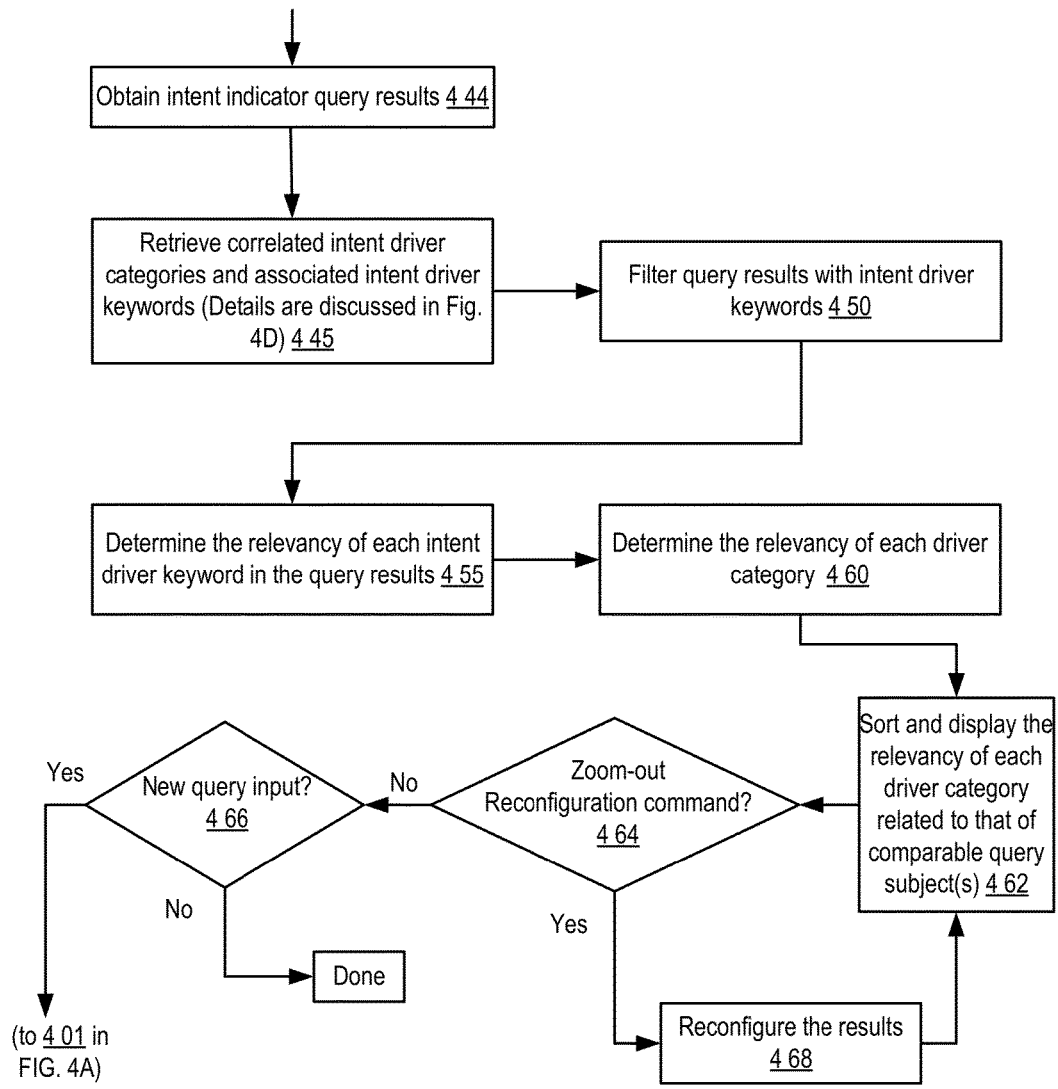
FIG. 4B shows an implementation of logic flow for an Intent Driver Panel in one embodiment of AAA operation.

FIG. 4B shows an implementation of logic flow for an Intent Driver Panel in one embodiment of AAA operation. In some implementations, upon obtaining the intent indicator query results 444, as discussed in FIG. 4A, the AAA may access the AAA database and retrieve correlated intent driver categories and associated intent driver keywords. Intent drivers may, in some implementations, reflect reasons that consumers intend to purchase a product 445. For example, as illustrated in FIG. 5A, when a consumer discusses his intent to watch a particular movie on a social networking website, he may mention that "I want to watch Movie ABC because I like their clothes." Based on this discussion, the intent driver keyword may be extracted from "I like their clothes," and the associated intent driver category (i.e., intent driver) may be "Costume" 504. As another example, a consumer may mention that "I am going to watch Movie ABC because I love explosion scenes." Based on this discussion, the intent driver keyword may be extracted from "I love explosion scenes," and the associated intent driver category may be "Special Effects" 507. Further detail about generating the correlated intent driver categories and associated intent driver keywords is discussed in FIG. 4D.

Returning to FIG. 4B, having obtained the intent driver keywords and intent driver categories, the AAA may filter the query results 416 with intent driver keywords 450, and determine relevancy of each intent driver keyword in the query results 455. Following that, a relevancy of each driver category may be determined 460. In some implementations, the relevancy may be determined based on weighted scoring. In some implementations, the relevancy of each driver category may be an aggregated relevancy of each intent driver keyword in the category. The AAA may sort the intent driver categories based on the relevancy, which may be displayed in relation to the comparable and/or associated query subjects.

In some implementations, the user may desire to see the relevancy of the intent driver categories relative to the different ranges of the comparable query subjects. The AAA may receive a zoom-out (or zoom-in) reconfiguration command through a user interface from the user 464 (e.g., a click on the Intent Driver Panel of the UI, and/or the like). Upon receiving such request, the AAA may reconfigure the results 468 and display to the user the relevancy of the intent driver categories relative to a full range or a smaller range of the comparable query subjects. The user may enter a new query input 466 and the AAA may process from step 401 as in FIG. 4A.

Figure 4C:
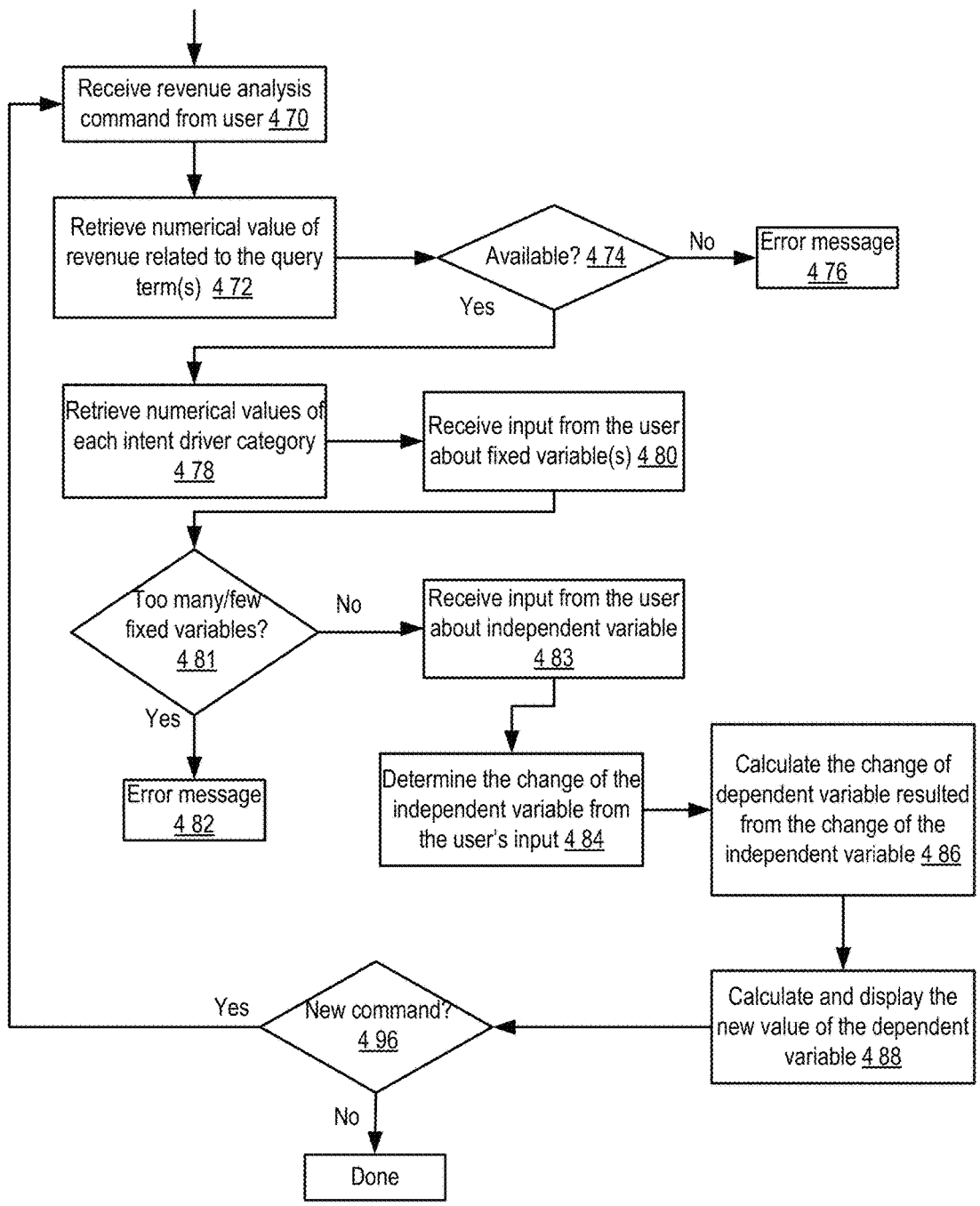
FIG. 4C shows an implementation of logic flow for an Intent Driver Interactive Slider in one embodiment of AAA operation.
Figure 5B:
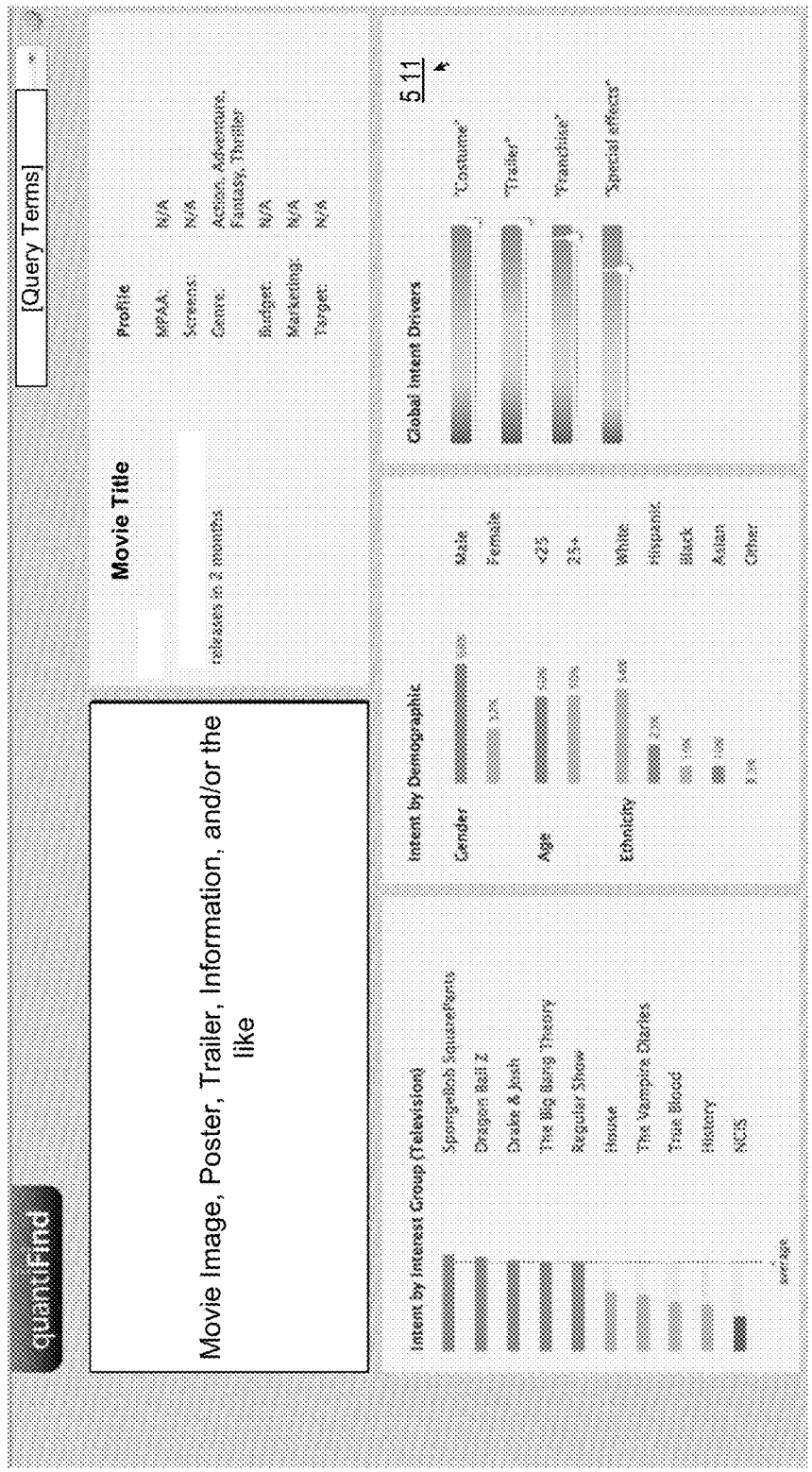

FIG. 4C shows an implementation of logic flow for an Intent Driver Interactive Slider in one embodiment of AAA operation. A user may desire to see the correlation between the intent drivers and quantities associated with the query term. For example, a producer of a movie may desire to obtain a strategic marketing analysis of the movie. As an example, if there are additional resources (e.g., budget) that may be spent to improve a feature of the movie in order to increase the revenue, the AAA may determine how much revenue may be brought about by spending the additional resources on one or more features (e.g., costumes, special effects, star power, and/or the likes). In one implementation, the AAA may automatically allocate resources according to an optimization protocol (e.g., allocating resources to features in proportion to their relative impact on revenue). As another example, the AAA may determine how changing one intent driver would result in changes in another intent driver required to keep a factor, such as projected revenue, fixed (e.g., by adjusting the first driver to a desired level, then adjusting the second driver until revenue is restored to its original value). In some implementations, the AAA may receive a revenue analysis command from the user 470 and may access the AAA database and/or a third party database to retrieve and/or determine a numerical value of revenue related to the query term(s) 472. If the numerical value of revenue is not available 474, the AAA may generate an error message 476. If the numerical value of revenue is available, the AAA may proceed to retrieve numerical values of each intent driver category 478 from the AAA database. The numerical values of the intent drivers may be related to the relevancy calculated from step 460 from FIG. 4B. Upon receiving the numerical values of the intent drivers, the user may provide input about which variables they would like to have fixed in order for the AAA to provide the analysis 480. In some implementations, variables which may be held fixed may include one or more intent drivers, revenue, budget, release date, marketing target group, and/or the like. In one implementation, the AAA may restrict the number of variables allowed to be held fixed. If the user selected fixed variables are more or less than the threshold 481, the AAA may generate an error message 482. If an appropriate number of fixed variables is received, the user may proceed to provide input on changes of one or more independent variables 483. In some implementations, the user may provide the input by sliding an interactive bar element (e.g., 515 as shown in FIG. 5B) in the Global Intent Drivers panel. The AAA may determine the change in the numerical value of the independent variable 484, and correspondingly calculate the change of dependent variable resulting from the change of the independent variable 486, such as based on one or more statistical regression models. Upon receiving the calculated change of the dependent variable, the AAA may calculate and display the new value of the dependent variable 488. For example, if the user would like to learn how much revenue may be generated by spending additional resources on costumes, the independent variable may be the intent driver "Costume," and the dependent variable may be the revenue, with other factors held fixed. A determination may be made as to whether a new command has been received from the user 496, such as for additional revenue analysis, and the AAA may return to 470 if that determination is affirmative. Otherwise, the revenue analysis procedure may conclude.

Figure 4D:
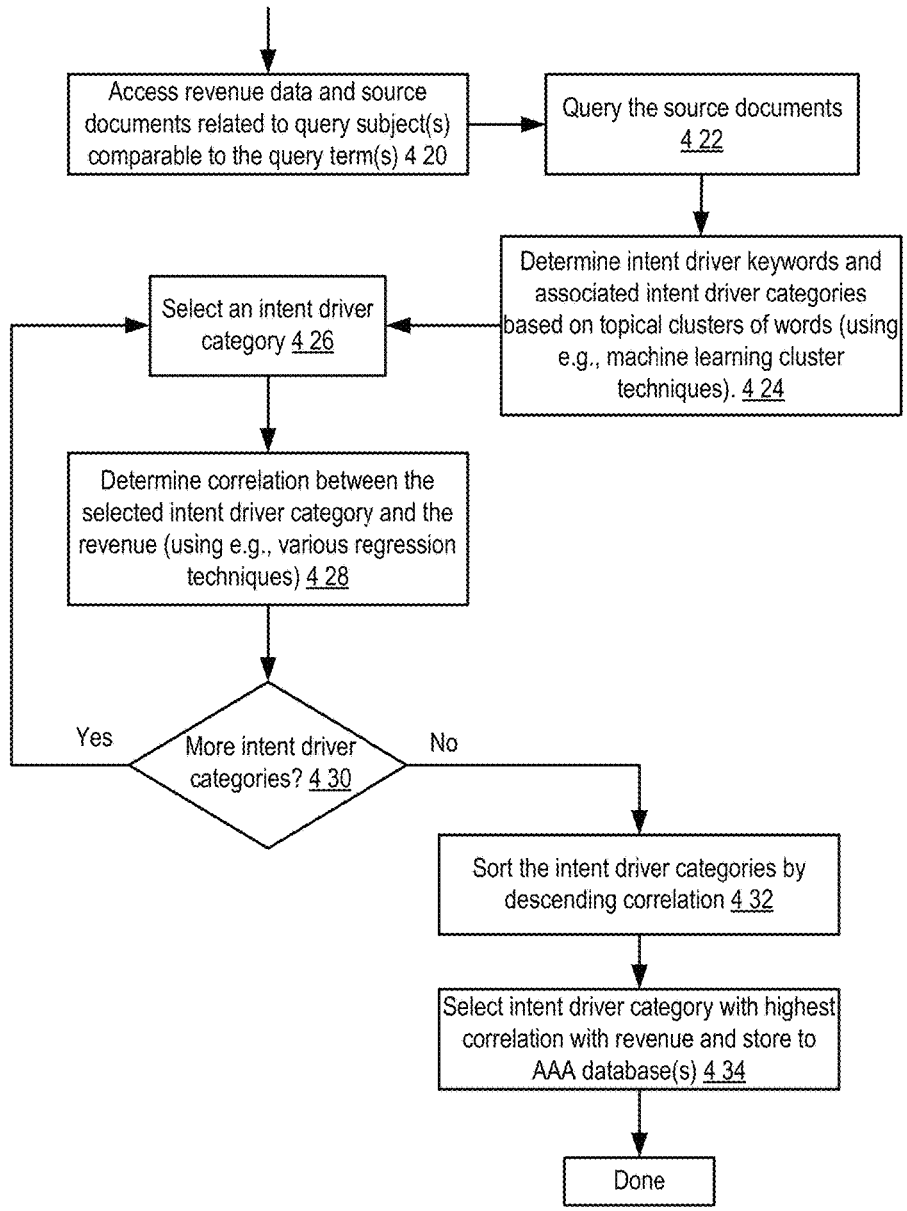
FIG. 4D shows an implementation of logic flow for Intent Driver Selection in one embodiment of AAA operation.

FIG. 4D shows an implementation of logic flow for Intent Driver Selection in one embodiment of AAA operation. In some implementations, the AAA may determine the intent driver keywords and associated intent driver categories based on query subjects comparable to the query terms. The AAA may access revenue data and source documents of the query subjects 420. For example, if the query term is "Movie ABC" the AAA may retrieve source documents of past movies, movies in the same genre, movies made by the same company, and/or the like. The AAA may also retrieve revenue data associated with selected movies (e.g., box office revenue). Upon receiving the source documents of the query subjects, the AAA may query the source documents 422 and analyze query results to identify intent driver keywords and associated intent driver categories 424. In some implementations, the intent drivers are selected based on which topical clusters of words have been shown to be historically correlated with revenue values and/or outcomes. In one implementation, topical clusters of words may be learned by automated machine learning cluster techniques. Once the intent driver categories are determined, the AAA may select one or more intent driver categories 426, and determine the correlation between each selected intent driver category and the revenue 428. In some implementations, various regression techniques (e.g., linear regression, logistic regression, and/or the like) may be used to determine the correlation, wherein the intent driver category may be the independent variable, and the revenue may be the dependent variable. If there are more intent driver categories 430, the AAA may select the next intent driver category and determine its correlation. In some implementations, the regression model may engage multiple independent variables at the same time and determine the correlation. Once the AAA determines the correlation for each intent driver category, it may sort the intent driver categories by descending correlation 432. In one implementation, the AAA may select one or more intent driver categories that have highest correlation with revenue and store them to the AAA database 434.

FIGS. 5A-5B show implementations of user interface for an Intent Driver Panel in one embodiment of AAA operation. With reference to FIG. 5A, in some implementations, when a user enters a movie title or related keywords as a query term, the AAA may retrieve profile data 501, a poster image 502, and/or the like information related to the movie and display them in the AAA user interface. In some implementations, the profile data may include, but are not limited to, MPAA rating, screens, genre, budget, marketing, target, and/or the like. The object (e.g., the movie or other query target) may be an event happening currently, at an earlier time, and/or at a future time (e.g., releases in 2 months). The UI may also display highly correlated intent drivers for query subjects comparable to the query term. For example, for movies comparable to a particular movie, intent drivers with the highest correlation to the revenue may be costume 504, trailer 505, franchise 506, and special effects 507. Each intent driver may be displayed as a bar from lowest relevancy (e.g., lightest color on the left) to highest relevancy (e.g., darkest color on the right). The Global Intent Drivers panel 503 may also display the relevancy of each intent driver for the query term. For example, the handle 508 on each bar may represent the relevancy of the intent driver for the queried movie relative to that of movies comparable to it. For intent drivers "Costume" and "Trailer," the handles are at the far right side of the bars, which may represent that intent to watch the movie is more of a consequence of costume and trailer as compared to other comparable movies. In various implementations, these other movies considered in the Global Intent Drivers panel 503 may be all movies released in the past, movies in the same genre as the queried movie, movies by the same director, movies with the same leading actor, and/or the like. For the intent driver "Franchise," correlation with intent to watch the movie is high in relation to other comparable movies, but there are movies that have higher intent correlation with "Franchise" than the queried movie. For the intent driver "Special Effects," correlation of intent to watch the queried movie with special effects is medium in relation to other comparable movies. In some implementations, the user may slide the handle 508 to interact with the AAA and be presented with a revenue analysis, such as discussed in FIG. 4C.

With reference to FIG. 5B, in some implementations, the user may desire to see the relevancy of the intent driver categories relative to the different ranges of the comparable query subjects. As described in FIG. 4B steps 464 and 468, the AAA may receive a zoom-out (or zoom-in) reconfiguration command through a user interface from the user 464 (e.g., a click on the Intent Driver Panel of the UI 511, and/or the like). Upon receiving such request, the AAA may reconfigure the results 468 and display to the user the relevancy of the intent driver categories relative to a full range or a smaller range of the comparable query subjects. The intent driver bars may be presented in different colors, e.g., may be red in the lower range of the bar, white in the middle range of the bar, green in the higher range of the bar, and/or the like. In one implementation, lower range of the bar may indicate lower intent, and higher range of the bar may indicate higher intent.

FIG. 6 shows an implementation of logic flow for an Intent By Demographic Panel in one embodiment of AAA operation. In some implementations, a user may desire to learn demographic distributions related to people who have shown positive and/or negative intent with regard to the query term. An example use of the intent by demographic information may be to inform a user and/or automated system to more efficaciously allocate future marketing spending for better consumer targeting. The AAA may obtain intent indicator query results 601 which include query results filtered with positive intent indicator keywords. One implementation of generating intent indicator query results is discussed in FIG. 4A. The AAA may collapse the source documents included in the query results based on a user field 602, in order to identify unique individual users 603. The user field may, in various implementations, be user name, user identifier, user's IP address, user device address (e.g., MAC address), and/or the like. The AAA may proceed to retrieve demographic information of the identified users from the AAA database and/or third party database(s) 605. The demographic information may include gender, ethnicity, age, location, employment status, household income, and/or the like. If the demographic information is not available 615, the AAA may generate an error message. Upon obtaining the demographic information, the AAA may calculate, such as on a user basis, demographic distribution for each demographic category (e.g., gender, age, ethnicity, and/or the like) 616 for display 617. The distribution may be presented, for example, in percentage and/or absolute values.

In some implementations, the user may desire to see the demographic distributions of the query term relative to industry averages. The AAA may receive a reconfiguration command through a user interface from the user 618 (e.g., a click on the Intent by Demographic Panel of the UI 710, and/or the like). The AAA may then retrieve and calculate the average of demographic distributions for each demographic category 620 and provide those averages and/or comparison therewith for display 625.

Figure 7A:
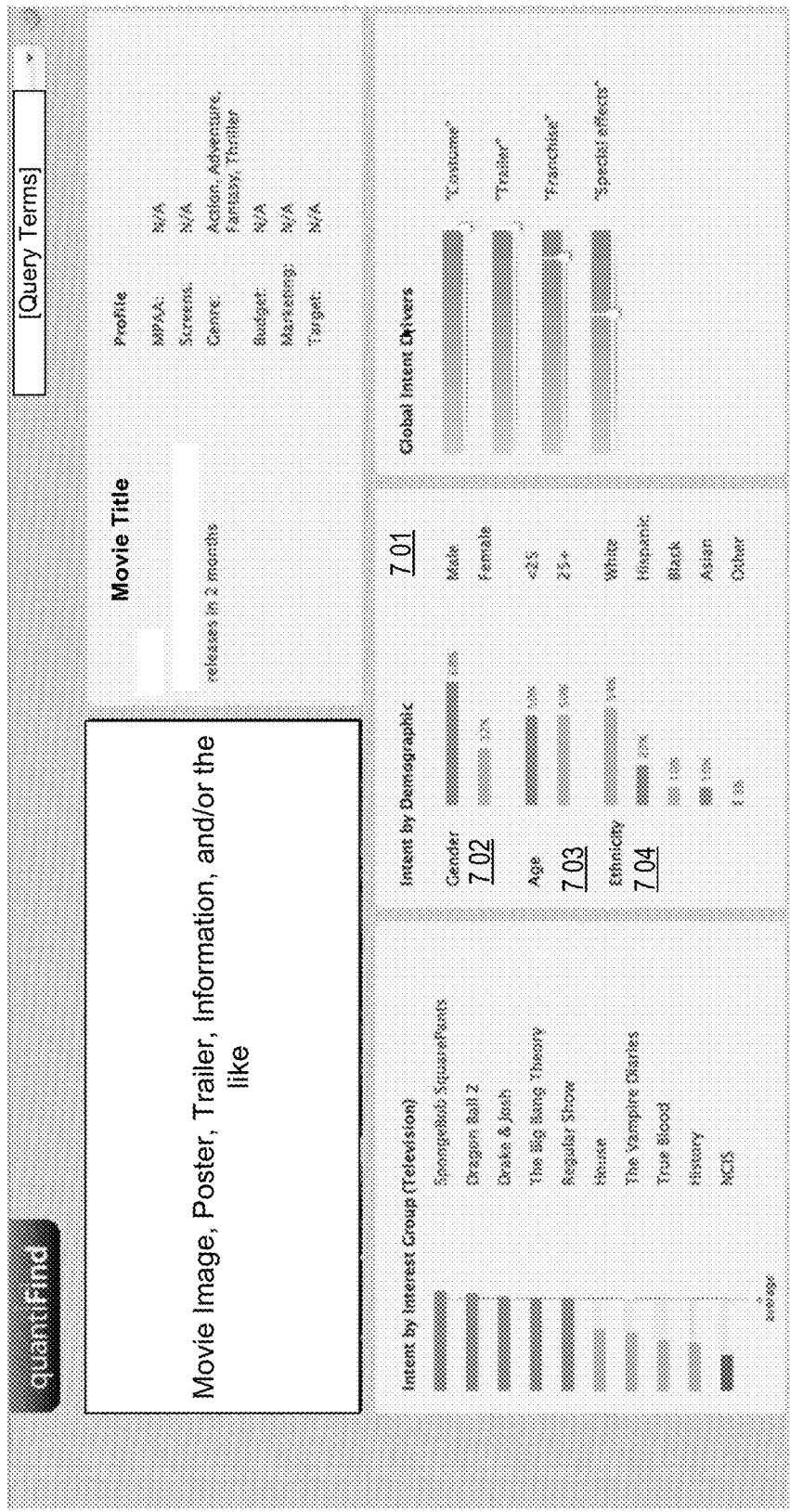
FIGS. 7A-7B show implementations of user interface for an Intent By Demographic Panel in one embodiment of AAA operation.
Figure 7B:
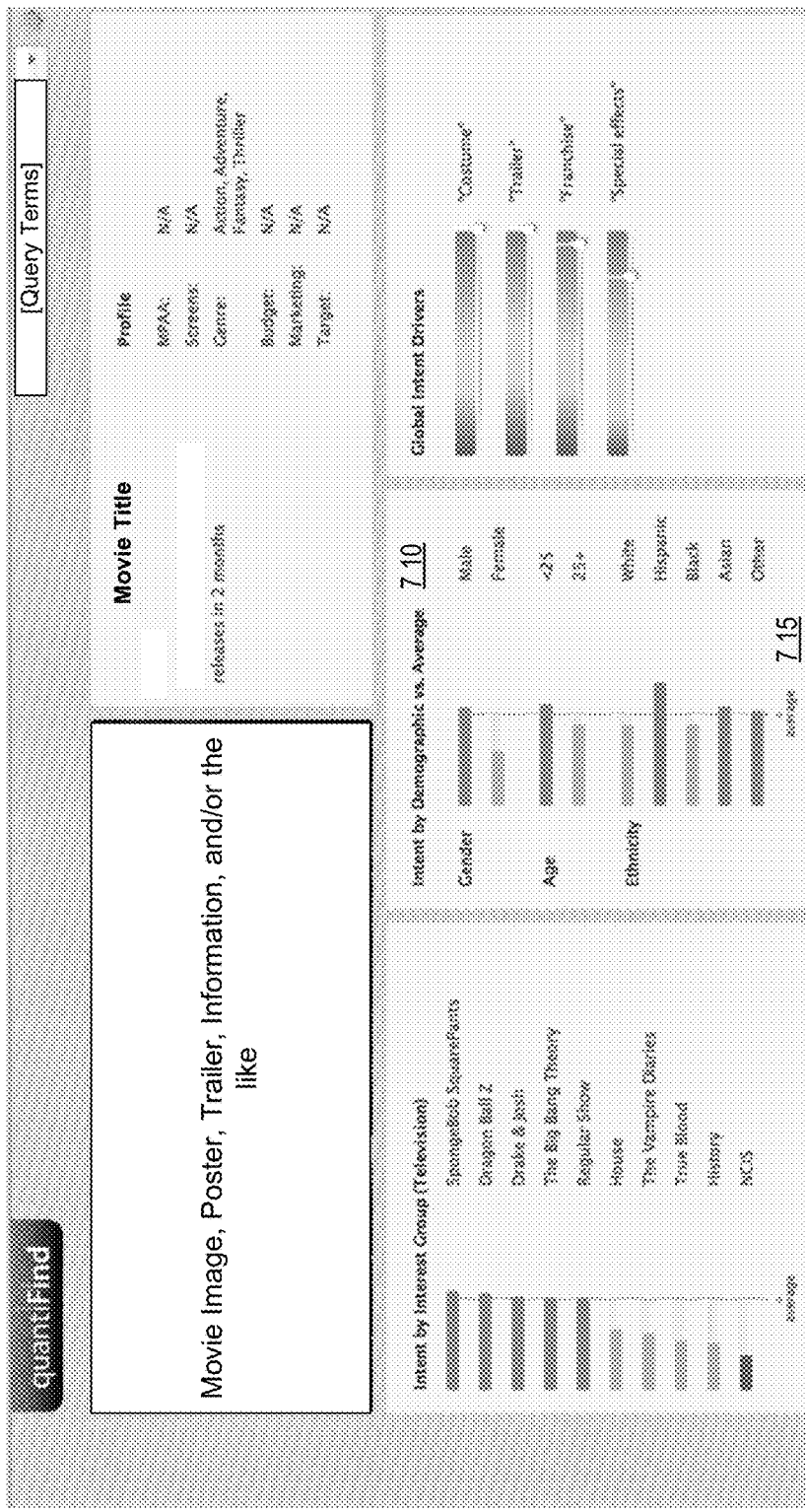

FIGS. 7A-7B show implementations of user interface for an Intent By Demographic Panel in one embodiment of AAA operation. With reference to FIG. 7A, the Intent by Demographic Panel 701 is shown with non-limiting exemplary demographic categories: gender 702, age 703, and ethnicity 704. The user may have the option to add additional demographic categories or delete current ones. The example in the figure shows that 68% of people who intend to watch the queried movie are male, and 32% are female. Half of people who intend to watch the queried movie are younger than 25 years old, and half are older. 54% of people who intend to watch the queried movie are White, 23% are Hispanic, 10% are Black, 10% are Asian, and 3% are other ethnicities. In some implementations, the demographic distribution may be presented in different colors and/or configured in accordance with other visual cues.

With reference to FIG. 7B, the user may desire to see the demographic distribution of the query term relative to industry average. As discussed with reference to FIG. 6, the AAA may receive a reconfiguration command through a user interface from the user 618 (e.g., a click on the Intent by Demographic Panel of the UI 710, and/or the like). The AAA may retrieve and calculate the average of demographic distributions for each demographic category for display 715. The industry average may be presented, for example, as a dotted line across all demographic categories.

FIG. 8 shows an implementation of logic flow for an Intent By Interest Group Panel in one embodiment of AAA operation. In some implementations, a user may desire to know what other interests and/or interest groups are likely for consumers having a positive and/or negative intent with respect to the query terms. The user and/or one or more automated systems may then make strategic decisions related to the query term based on the information learned about consumers' other interests. For example, in the movie industry, the AAA may indicate that people who have shown interest in a particular movie also have interests in a particular TV show. The AAA may then direct placement of the trailer or other marketing materials for the movie during the broadcast of that TV show to target consumers likely to be receptive. In some implementations, the AAA may obtain intent indicator query results 801, which may include query results filtered with positive intent indicator keywords. One implementation of generating intent indicator query results is discussed in FIG. 4A. The AAA may receive interest group keywords and associated group categories from AAA database(s) 802. The AAA may filter the intent indicator query results with interest group keywords 805 and determine the relevancy of each interest group keyword 810. In one implementation, the AAA may calculate the average relevancy of all interest group keywords 815. The user may be provided with the option to select different interest group categories 820. If the user does not provide an input on the interest group category, the AAA may identify an interest group category related to the query term 835, such as based on tags and/or metadata associated with interest group category identifiers in one or more AAA databases. If a match is identified 840, the AAA may sort and display the results in the order or relevancy in the identified interest group 845. If a match is not identified 840, the AAA may display the results in the order of relevancy regardless of interest group category 850. If the user provides an input on the interest group category selection 820, the AAA may identify keywords in the selected category 822, and sort and display the results in the order of relevancy of each keyword in the selected category 825. When the user provides a new input on the interest group category selection 830, the AAA may return to 820. The user may also enter a new query input 855 to cause the AAA to return to 801.

Figure 9A:
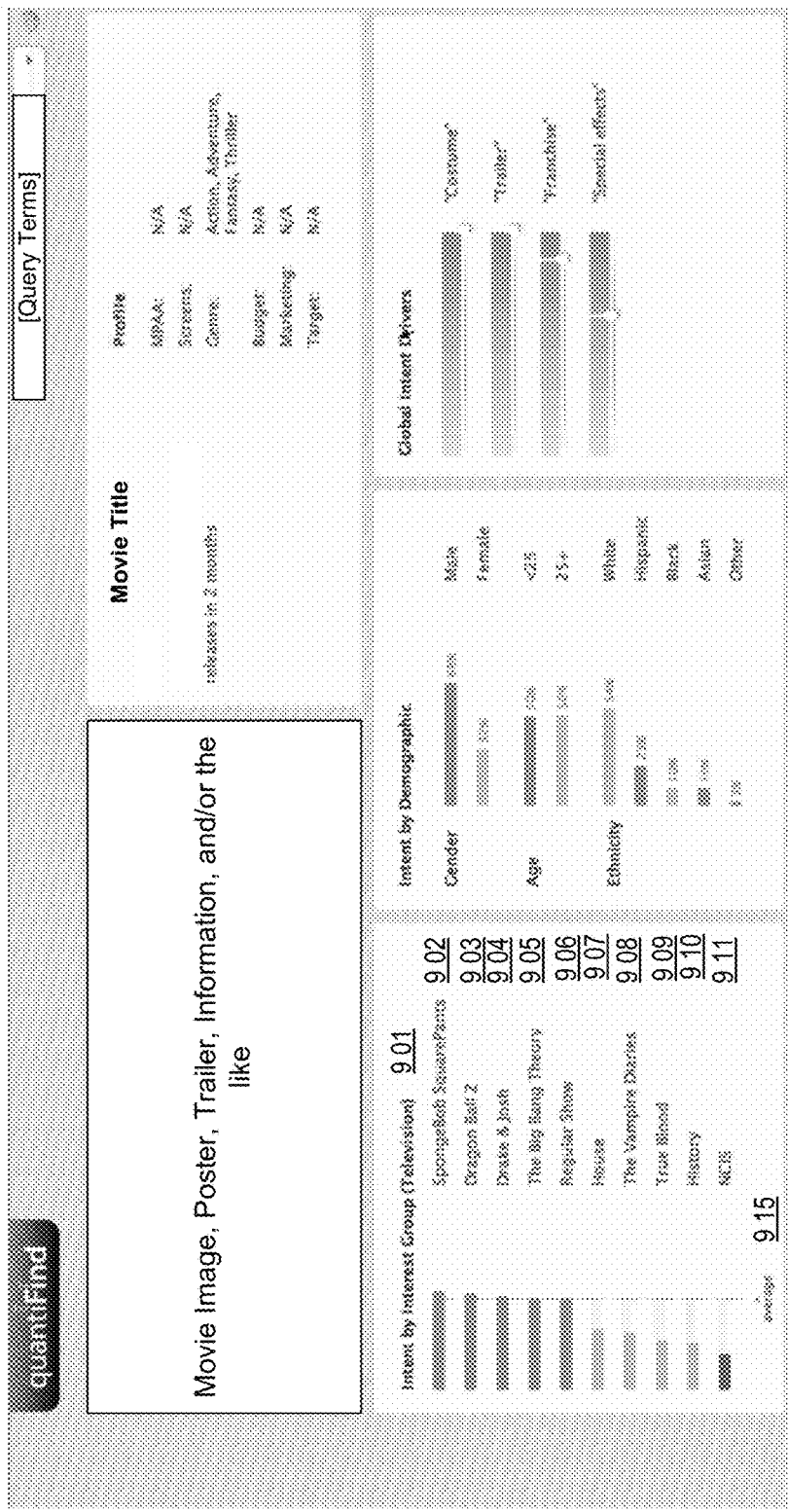
FIGS. 9A-9C show implementations of user interface for an Intent By Interest Group Panel in one embodiment of AAA operation.
Figure 9B:
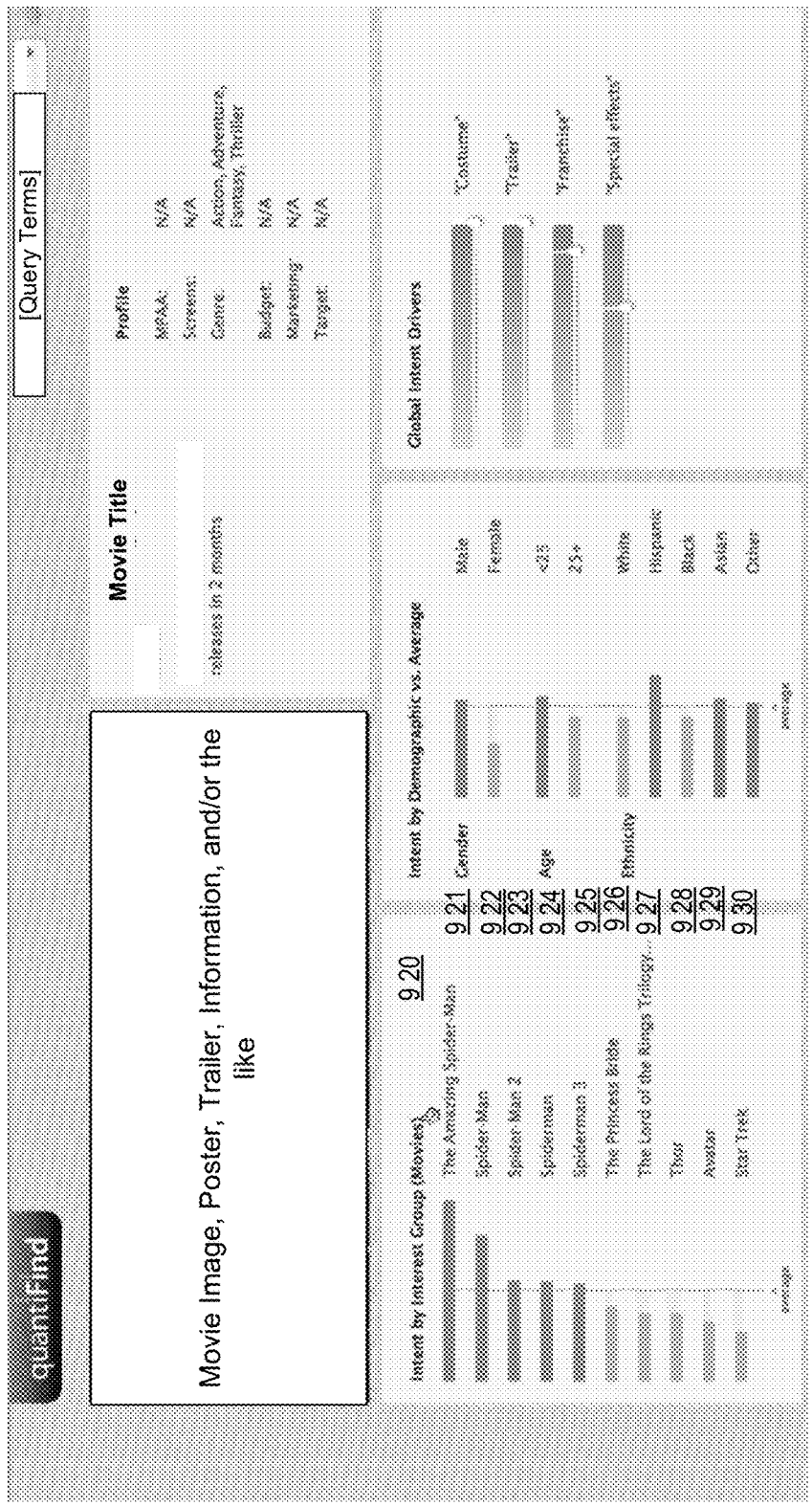
Figure 9C:
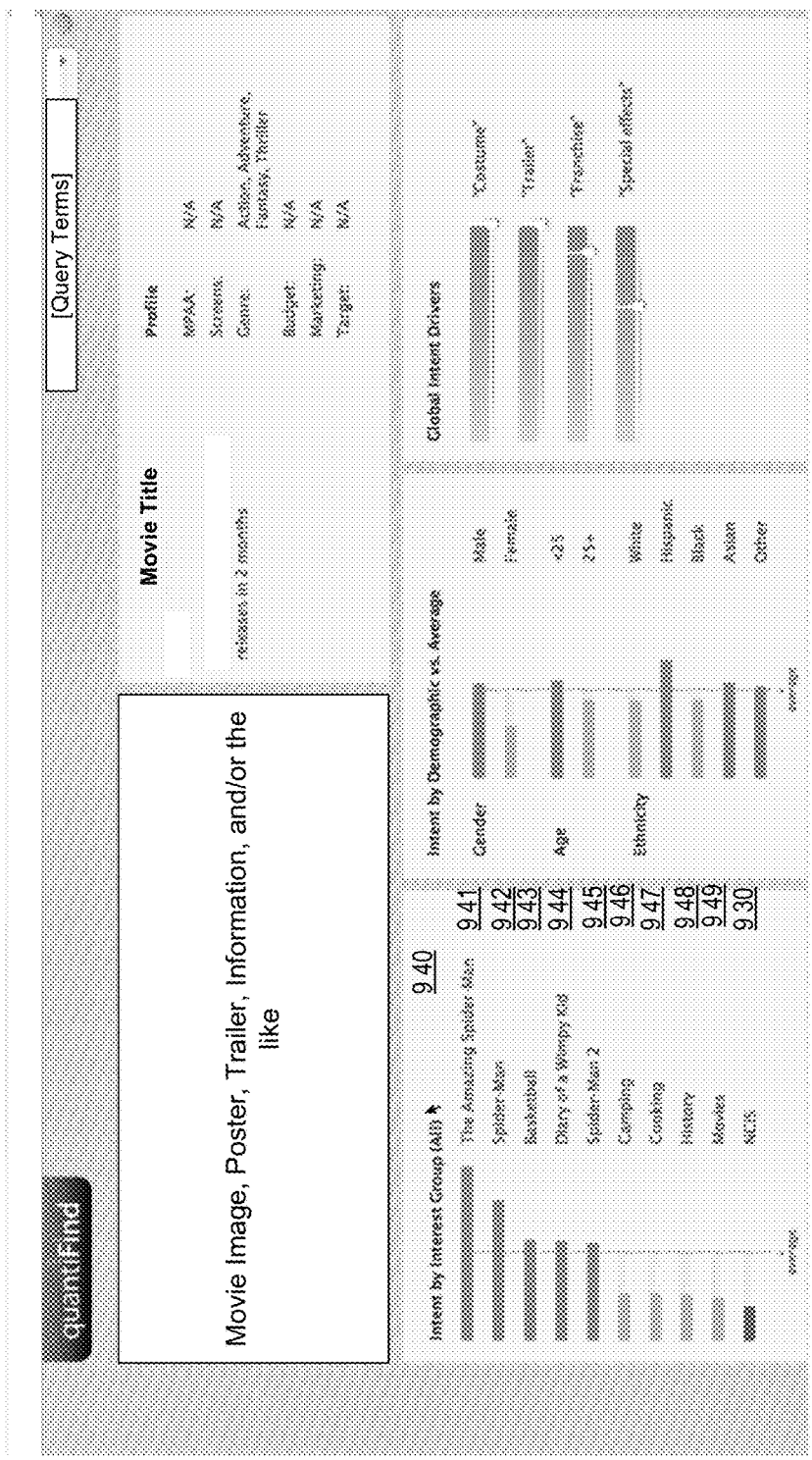

FIGS. 9A-9C show implementations of user interface for an Intent By Interest Group Panel in one embodiment of AAA operation. With reference to FIG. 9A, the Intent by Interest Group panel 901 is shown for interest group category "Television," as one exemplary implementation. People who have shown intent to watch the queried movie may have also indicated interests in interest group keywords such as SpongeBob SquarePants 902, Dragon Ball Z 903, Drake & Josh 904, The Big Bang Theory 905, Regular Show 906, House 907, The Vampire Diaries 908, True Blood 909, History 910, NCIS 911, and/or the like. In one implementation, the interest group keywords may be listed from the highest to lowest relevancy. In one implementation, the UI may also display the industry average 915 as a dotted line.

With reference to FIG. 9B, the AAA may receive an interest group category selection command through the user interface from the user (e.g., a click on the Intent by Interest Group Panel of the UI 920, and/or the like). In the illustrated example, the interest group category is changed to "Movies". People who have shown intent to watch a particular movie may have also indicated interests in interest group keywords identified as related to movies, such as The Amazing Spider-Man 921, Spider-Man 922, Spider-Man 2 923, Spiderman 924, Spiderman 3 925, The Princess Bride 926, The Lord of the Rings Trilogy 927, Thor 928, Avatar 929, Star Trek 930, and/or the like. In one implementation, the interest group keywords may be listed from the highest to lowest relevancy.

With reference to FIG. 9C, the AAA may receive another interest group category selection command through the user interface (e.g., a click on the Intent by Interest Group Panel of the UI 940, and/or the like). The interest group category may change to "All," which includes all interest group categories and keywords. People who have shown intent to watch a particular movie may have also indicated interests in general interest group keywords such as The Amazing Spider-Man 941, Spider-Man 942, Basketball 943, Diary of a Wimpy Kid 944, Spider-Man 2 945, Camping 946, Cooking 947, History 948, Movies 949, NCIS 930, and/or the like. In one implementation, the interest group keywords may be listed from the highest to lowest relevancy among all interest group keywords.

FIG. 10 shows an implementation of logic flow for a data expansion interaction in one embodiment of AAA operation. In some implementations, the AAA may receive a data expansion command 1001 through the user interface (e.g., a click on Male in the Intent by Demographic panel in the UI, a click on NCIS in the Intent by Interest Group panel in the UI and/or the like). The AAA may determine whether the command is related to a demographic category 1005, or an interest group keyword 1010. If neither is the case, the AAA may generate an error message 1015. If the command is a demographic category 1005, the AAA may identify the demographic category corresponding to the input, and proceed to filter query results with the received demographic category 1020. For example, with reference to FIG. 11A, if the data expansion command received at 1001 is a click on "Male," the AAA may filter query results to leave results generated by male people only. Otherwise, if the command is on an interest group keyword, the AAA may identify the interest group keyword corresponding to the input, and proceed to filter query results with the received interest group keyword 1055. After query results are filtered with either the demographic category or the interest group keyword, the AAA may retrieve the interest group keywords within the filtered query results 1025. The AAA may determine the relevancy of each interest group keyword within the filtered query results 1060, and retrieve intent driver keywords and associated driver categories within the filtered query results 1030. If intent driver keywords are available, then the AAA may determine the relevancy of each intent driver keyword within the filtered query results 1065. The AAA may then retrieve original keywords appearing in the source documents within the filtered query results 1035 and determine the relevancy of each original keyword 1070. The AAA may also display keywords in each category ordered by their relevancy within the category 1075. The categories may include, but are not limited to: interest groups, intent drivers if applicable, and original document keywords. The AAA may check whether there is a new query input 1050 and, if so, the AAA may return to 1001 to receive another data expansion command.

Figure 11A:
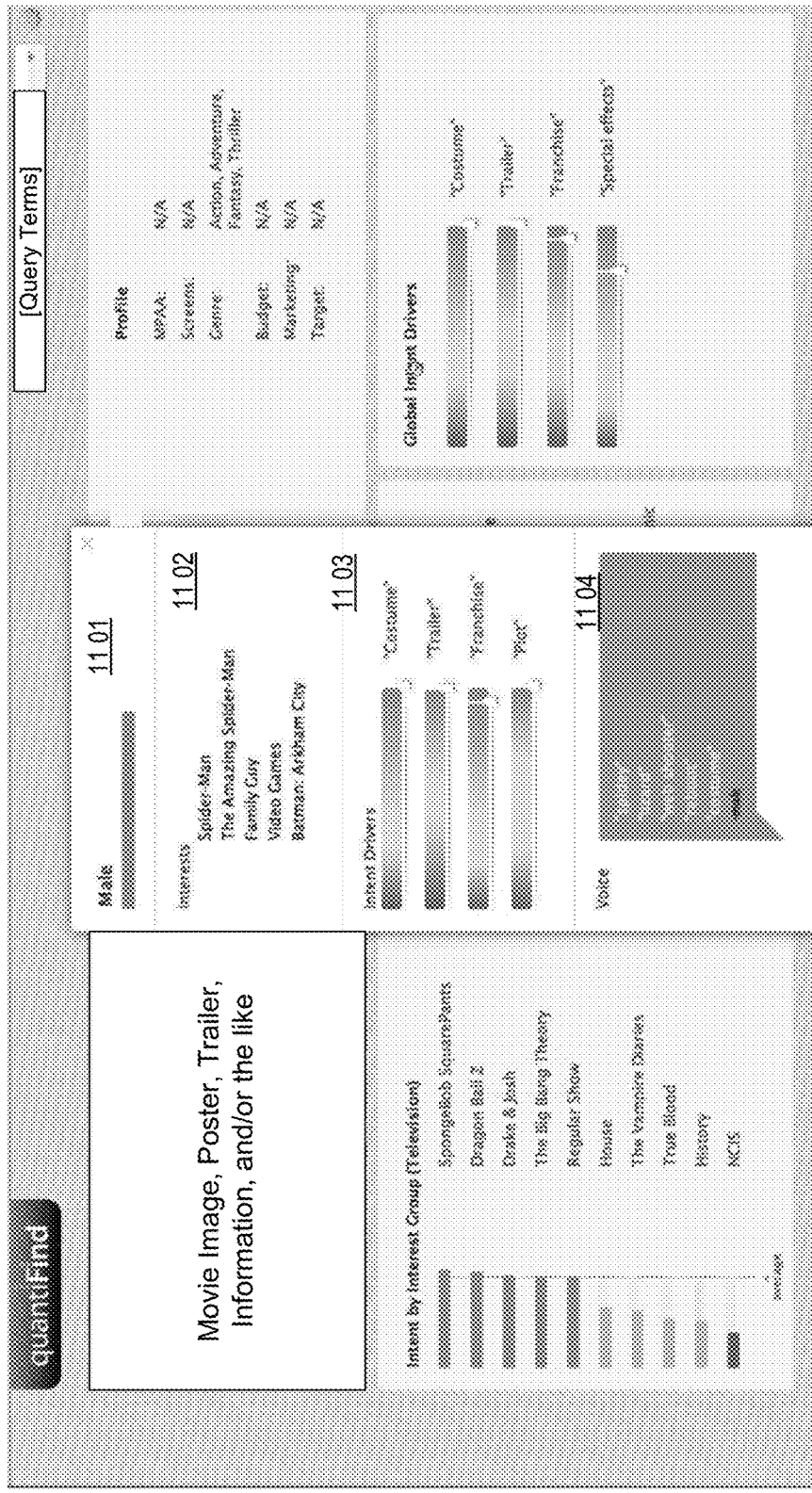
FIGS. 11A-11C show implementations of user interface for data expansion interaction in one embodiment of AAA operation.
Figure 11B:
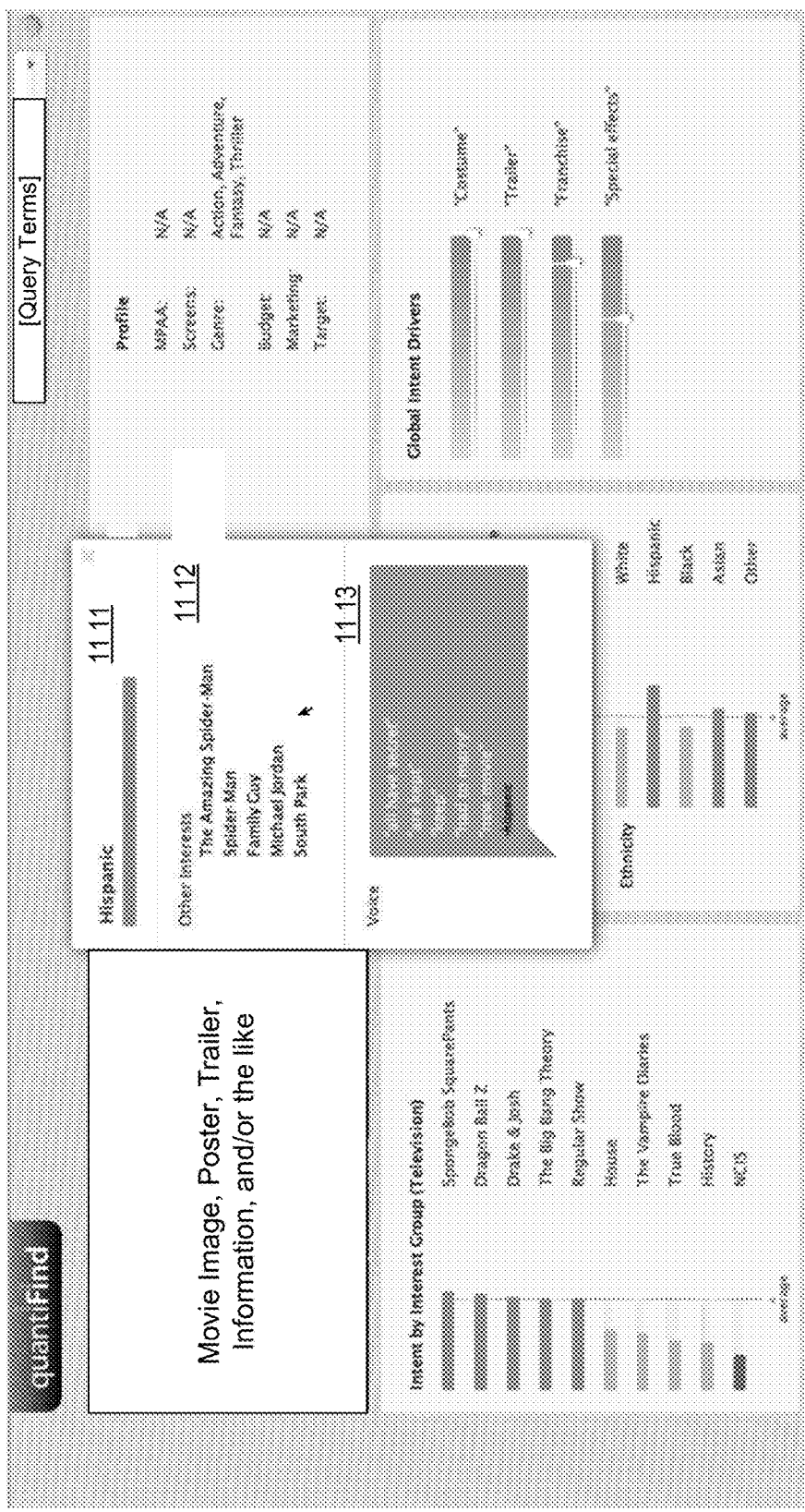
Figure 11C:
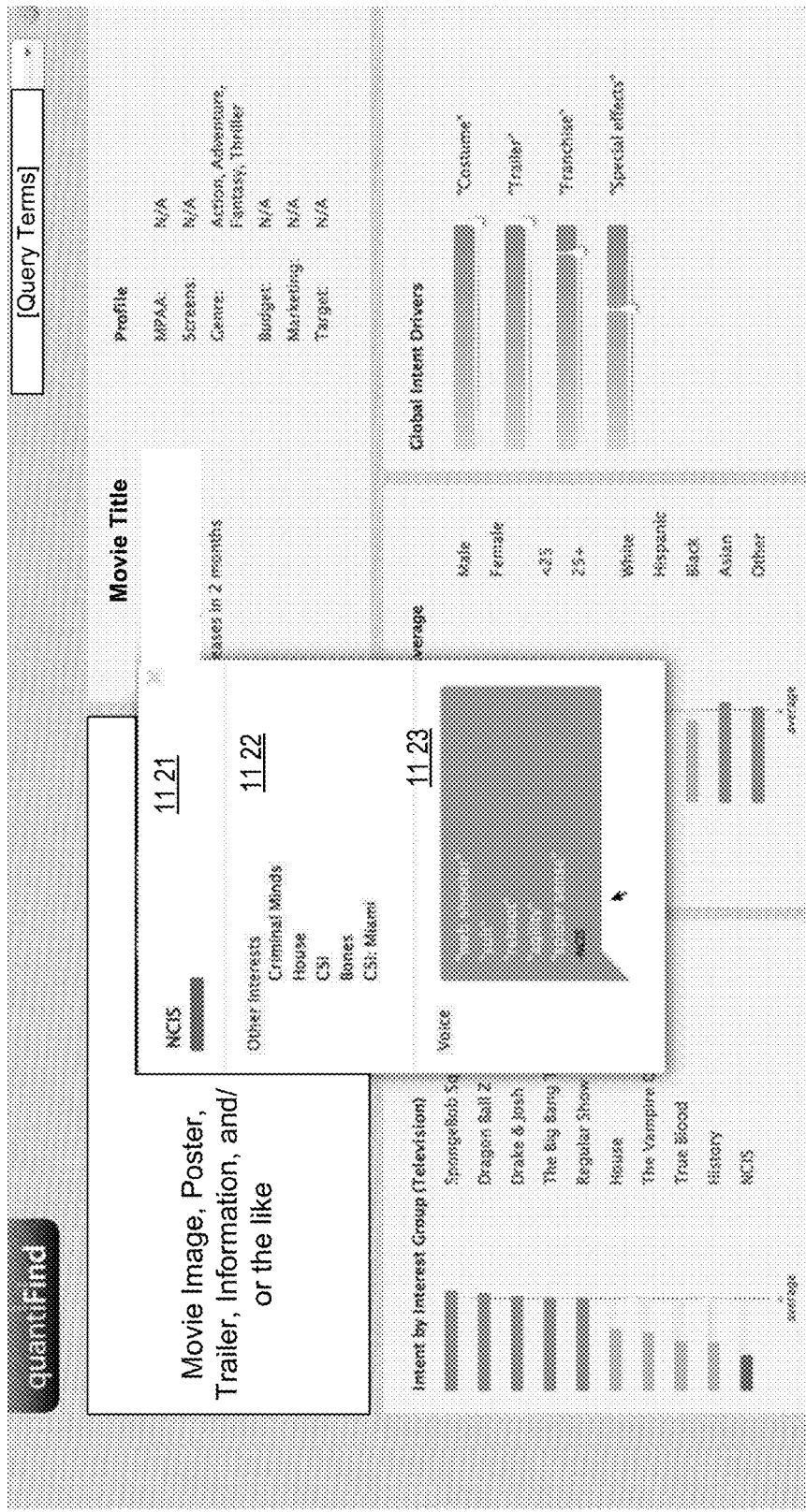

FIGS. 11A-11C show implementations of user interface for data expansion interaction in one embodiment of AAA operation. With reference to FIG. 11A, in some implementations, when a user clicks on the demographic category "Male," additional data may be presented related to males who have shown intent to watch the queried movie. In the data expansion panel 1101, it may also show their interest group keywords 1102, intent drivers 1103, statements about the queried movie 1104, and/or the like. With reference to FIG. 11B, in some implementations, when a user clicks on the demographic category "Hispanic" 1111, interest group keywords 1112 and discussions keywords (e.g., original keywords in the source documents) 1113 may be presented related to people with Hispanic ethnicity who have shown intent to watch the queried movie. With reference to FIG. 11C, in some implementations, when a user clicks on the interest group keyword "NCIS" 1121, other interest group keywords 1122 and discussions keywords (e.g., original keywords in the source documents) 1123 may be presented related to people with interests in the NCIS TV show who have shown intent to watch the queried movie.

FIG. 12 shows an implementation of logic flow for data comparison interaction in one embodiment of AAA operation. In some implementations, when a drag and drop data comparison command is received 1201, the AAA may determine whether, the requested comparison is with demographic categories 1205 or interest group keywords 1210. If neither is the case, then the AAA may generate an error message 1215. If the requested comparison is with demographic categories 1205, then the AAA may identify the two demographic categories associated with the drag and drop command 1220 and filter query results with the two identified demographic categories 1225. Otherwise, if the requested comparison is with interest group keywords 1210, then the AAA may identify the two interest group keywords associated with the drag and drop command 1265 and filter query results with the two identified interest group keywords 1270. In alternative implementations, other numbers of demographic categories and/or interest group keywords may be associated with the drag and drop command. The AAA may then retrieve demographic distribution information for each interest group keyword 1275 and compare the demographic distribution in each demographic category for each interest group keyword 1280. Then the AAA may determine the interest group keyword which has a higher demographic distribution in each demographic category 1285. In either case, where the requested comparison is with demographic categories or with interest group keywords, AAA may retrieve interest group keywords within the filtered query results 1230. Then the AAA may determine the relevancy of each interest group keyword within the filtered query results 1235. Next the AAA may identify a number of keywords (e.g., five, in one implementation) that have highest relevancy 1240. The AAA may then retrieve the original keywords appearing in the source documents within the filtered query results 1245 and determine the relevancy of each original keyword 1250 and display the comparison outputs, which include but are not limited to: the two demographic categories or interest group keywords, the corresponding demographic distribution, the retrieved interest group keywords, the original keywords in the order of relevancy in each category 1255, and/or the like. The AAA may also check whether there is a new query input 1260 and, if so, return to 1201 to receive a new drag and drop data comparison command.

Figure 13A:
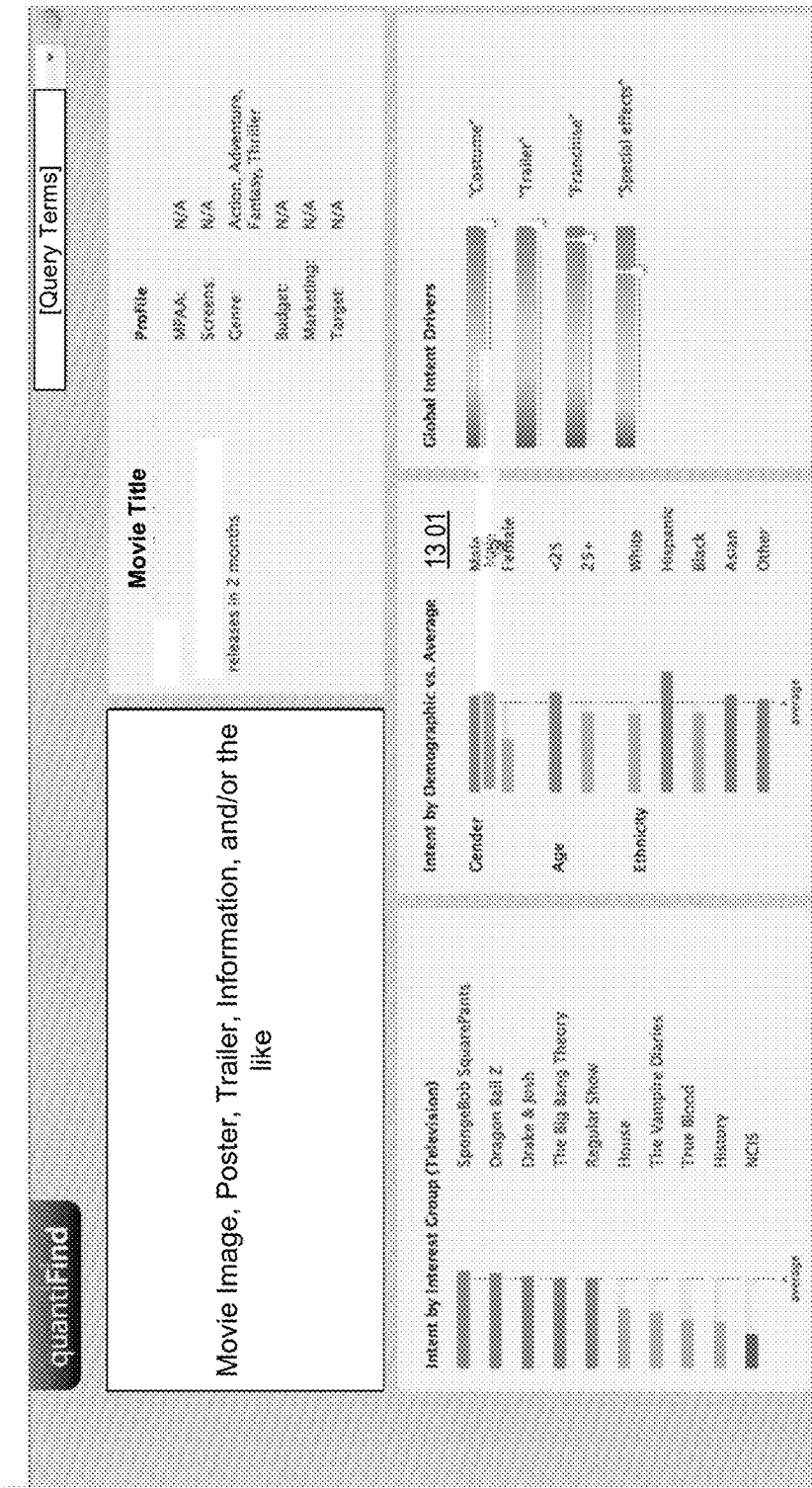
Figure 13B:
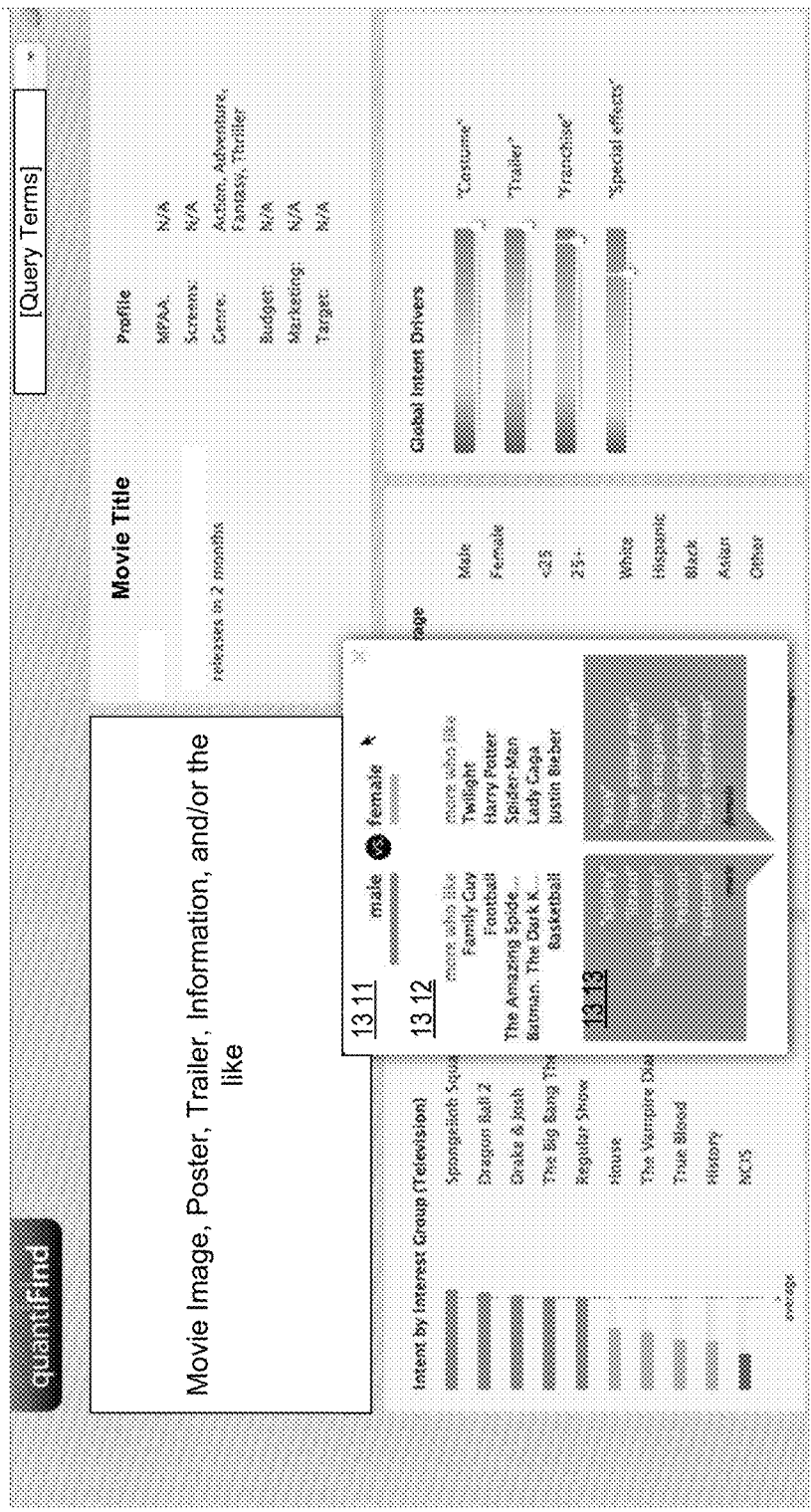
Figure 13C:
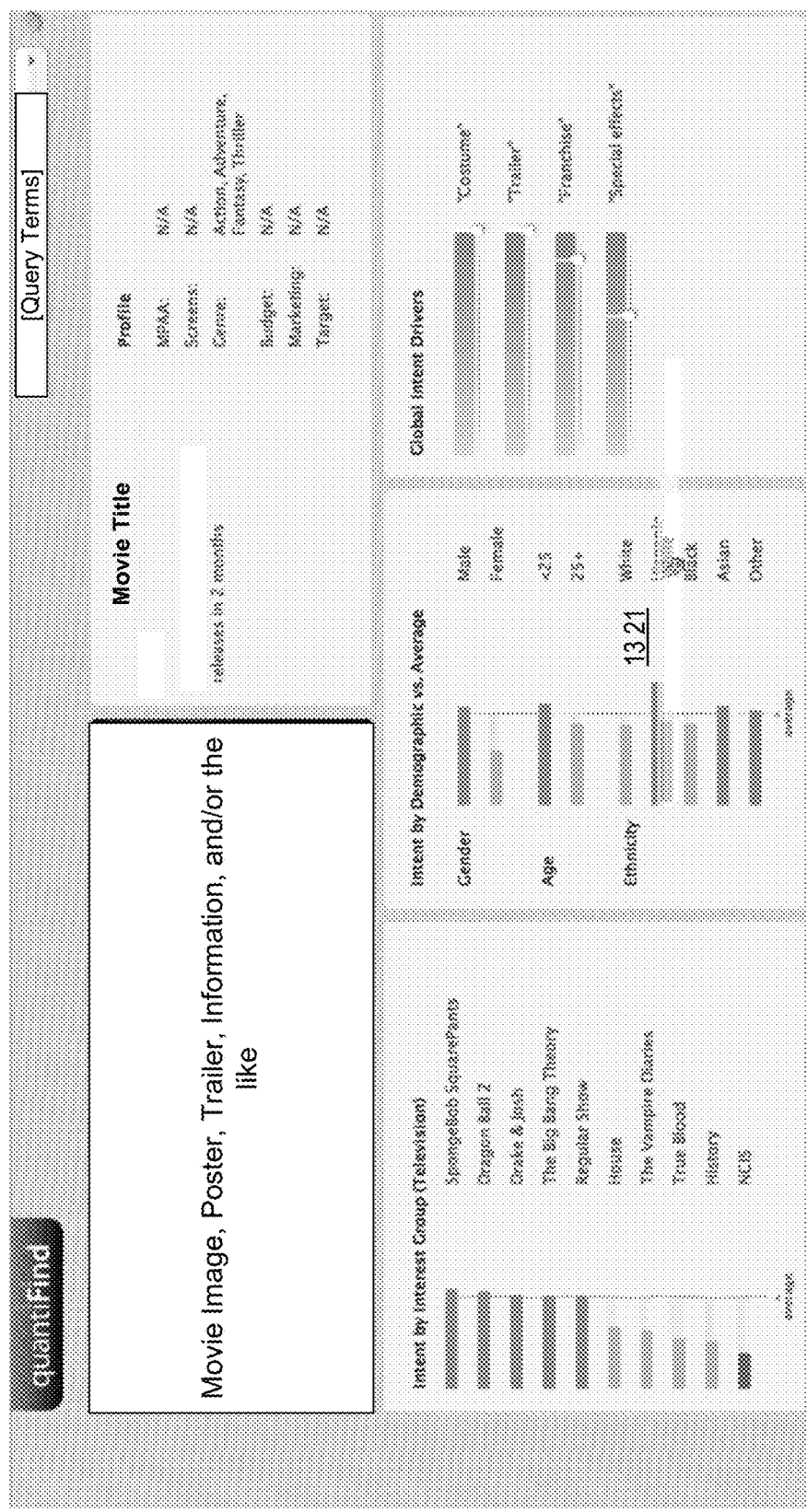
Figure 13D:
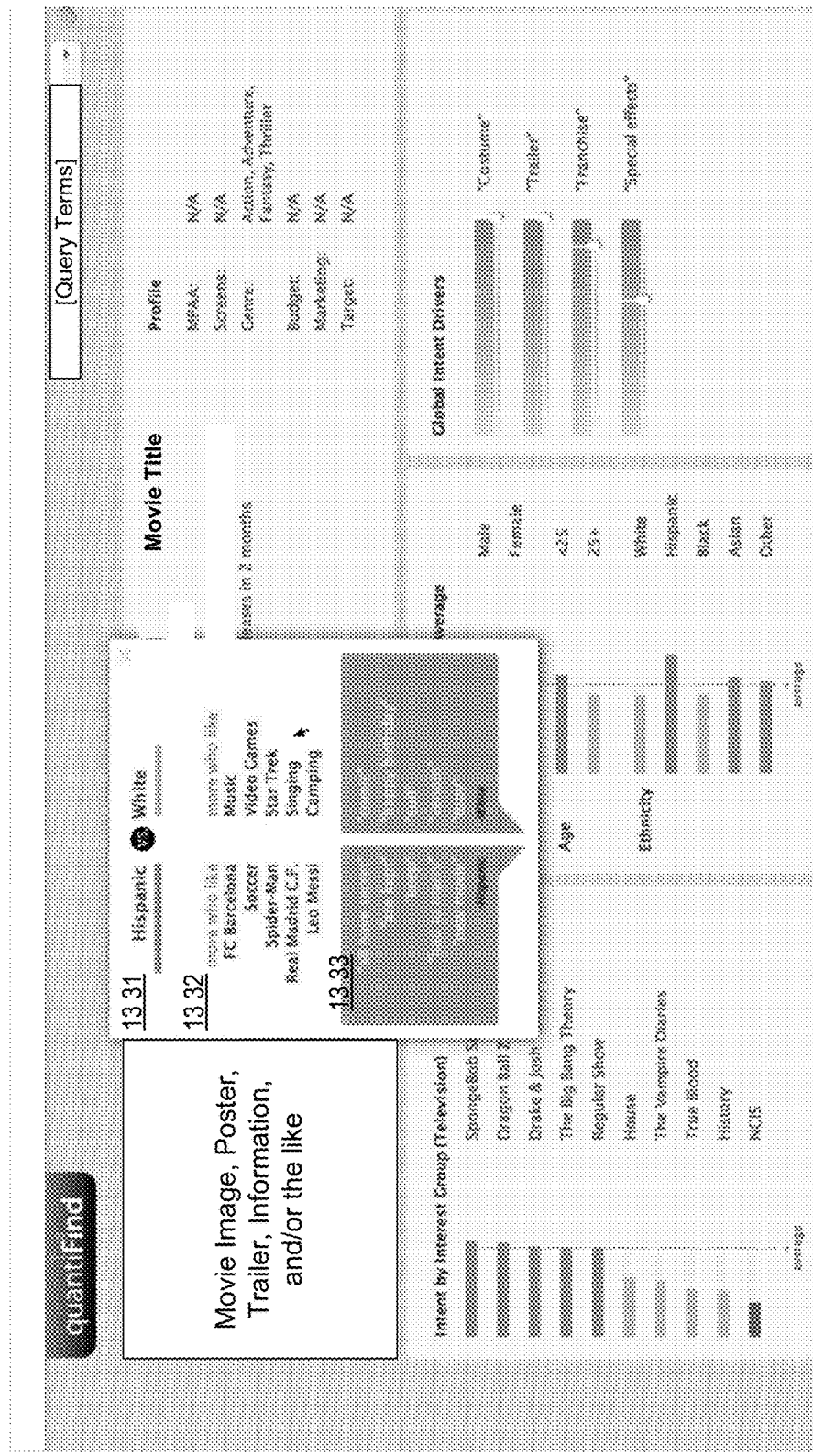
Figure 13E:
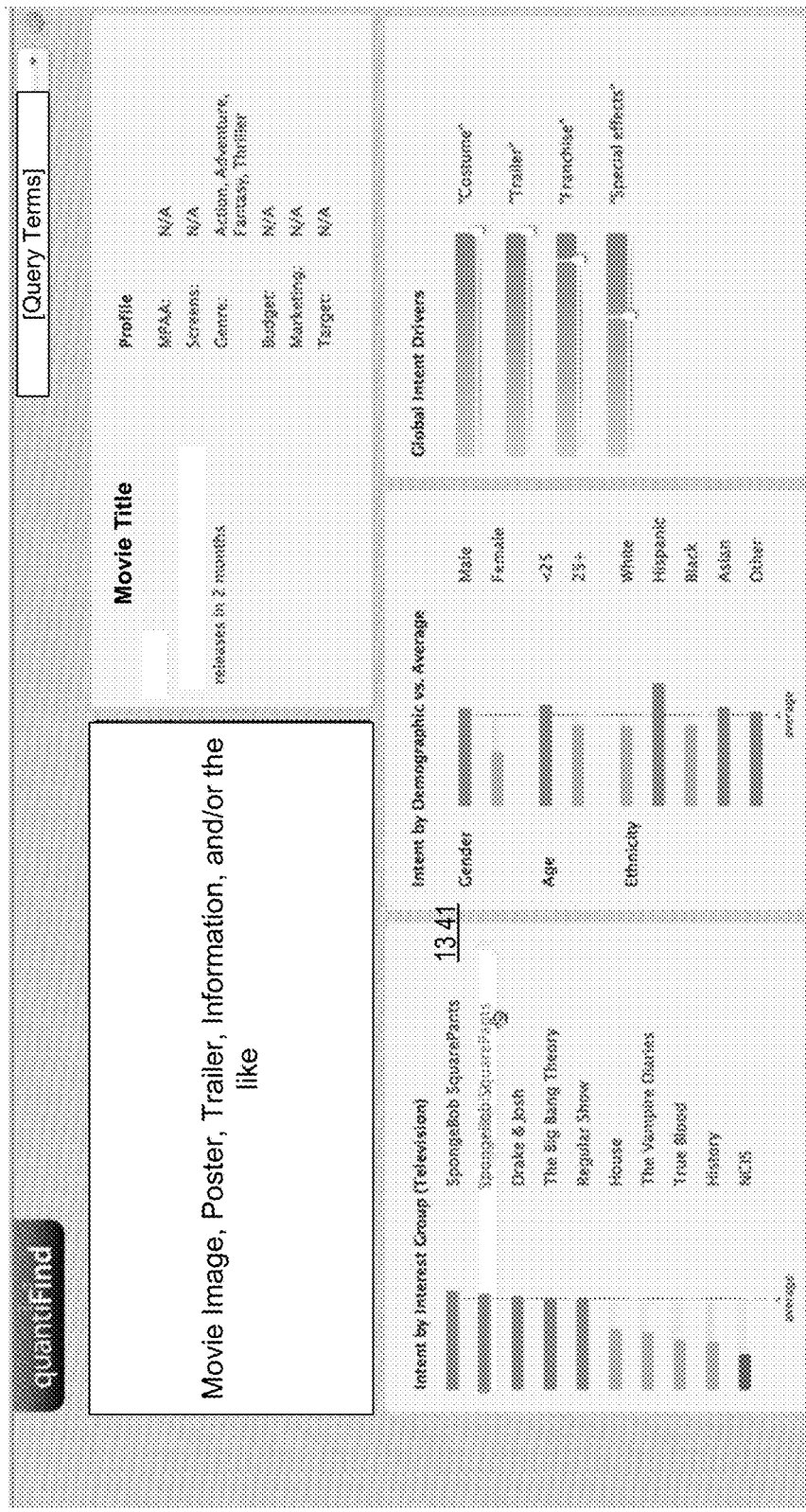
Figure 13F:
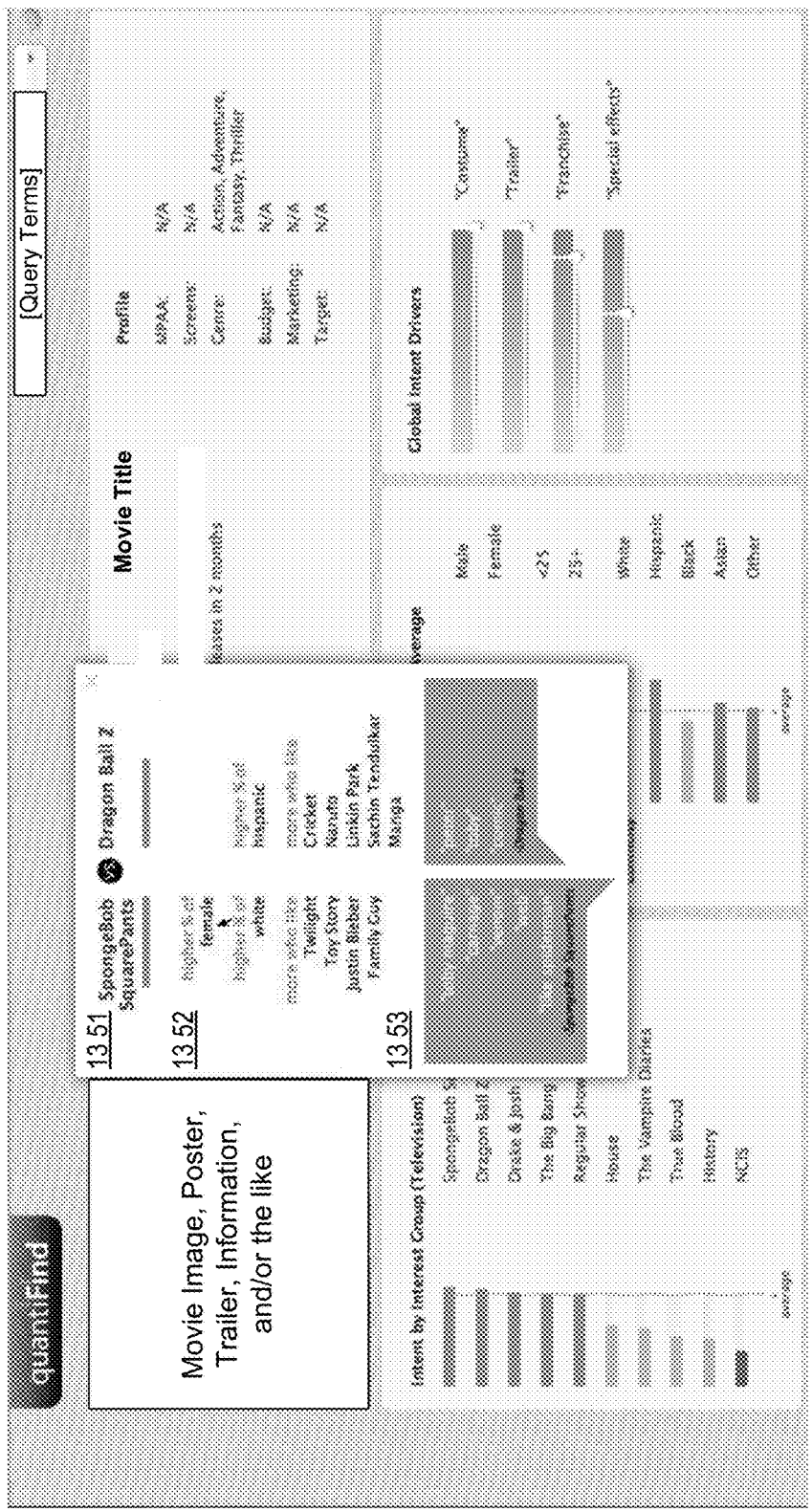

FIGS. 13A-13F show implementations of user interface for data comparison interaction in one embodiment of AAA operation. With reference to FIG. 13A, in some implementations, a user may start the data comparison, for example between male and female people who intend to watch the queried movie by dragging the Male entry and dropping it on the Female entry 1301. FIG. 13B shows an implementation of a side-by-side comparison between male and female who intend to watch the queried movie. In one implementation, a pop-up comparison window may present the selected demographic categories in proximity to an indicator of the strength of intent correlation with that category 1311. The interface may also include information on other interest groups correlated with the demographic category and/or the original query term 1312, as well as words or phrases drawn from source documents in correlation with the demographic categories and/or query terms 1313. With reference to FIG. 13C, in some implementations, a user may start the data comparison, for example between ethnic groups, by dragging one ethnic group, in this case "White," onto another, in this case "Hispanic" 1321. FIG. 13D shows an implementation of a side-by-side comparison between white and Hispanic individuals who intend to watch the queried movie. In one implementation, a pop-up comparison window may present the selected ethnic categories in proximity to an indicator of the strength of intent correlation with that category 1331. The interface may also include information on other interest groups correlated with the ethnic category and/or the original query term 1332, as well as words or phrases drawn from source documents in correlation with the ethnic categories and/or query terms 1333. With reference to FIG. 13E, in some implementations, a user may start the data comparison, for example between interest groups, by dragging and dropping one interest group, in this case "SpongeBob SquarePants," onto another, in this case "Dragon Ball Z" 1341. FIG. 13F shows an implementation of a side-by-side comparison between information pertaining to source documents correlated with the query term and each interest group within the comparison. In one implementation, a pop-up comparison window may present the selected interest groups in proximity to an indicator of the strength of correlation of each interest group with the query term 1351. The interface may also include demographic categories correlated with the interest group and/or the original query term 1352, other interest groups correlated with those identified demographic categories, and words or phrases drawn from source documents in correlation with the interest groups, demographic categories, and/or query terms 1353.

FIGS. 14A-14D show implementations of logic flow for revenue forecasting in one embodiment of AAA operation. A product query may be received 1401, such as comprising the name and/or other identifying indicia associated with one or more products. Product profile information and/or associated multimedia may then be retrieved based on the query 1405. A determination may then be made as to whether any product profile information has been provided by the user 1410, such as product descriptions, ratings, multimedia data, and/or the like. If so, the user-supplied product profile data and/or multimedia data may be received at 1415. The AAA may then retrieve a collection of keywords associated with positive or negative intent indicators from an AAA database 1420, and use those keywords in conjunction with the product query terms to query index data 1425. A determination may be made as to whether any matches are identified by this query 1430 and, if not, one or more error handling procedures may be undertaken, such as providing an error message to the user 1435. If a match is identified at 1430, then query results may be retrieved 1440 and filtered according to one or more positive and/or negative intent drivers 1445. The AAA may then determine the relevancy of each positive and negative intent driver 1450 within the filtered results, and display the positive and negative intend drivers to the user, such as sorted in order of relevancy 1455. The AAA may then retrieve demographic information associated with source documents (e.g., demographic information associated with users submitting social network updates and/or feed data) 1460. Based on the retrieved demographic information, the AAA may calculate and display a distribution and/or other statistical information associated with each demographic category and associated intent indicators 1465.

Figure 14B:
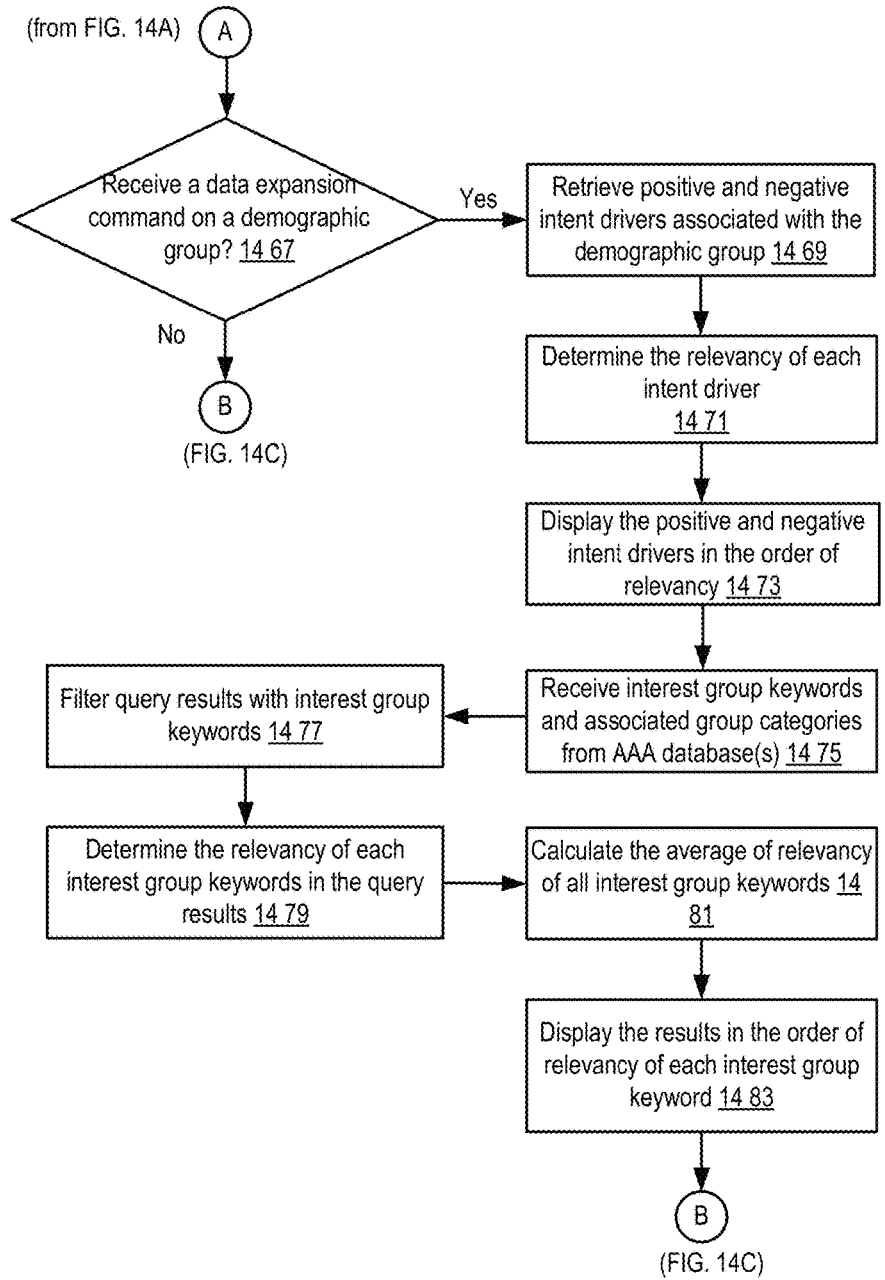

Proceeding to FIG. 14B, the AAA may determine whether a data expansion command on one of the demographic categories from 1465 is received 1467. If not, the AAA may proceed to 1485 of FIG. 14C, to be described below. However, if a data expansion command is received at 1467, the AAA may retrieve positive and/or negative intent drivers associated with the demographic group associated with the command 1469, and may determine the relevancy of each retrieved intent driver 1471. Positive and/or negative intent drivers may then be provided for display, such as sorted in order of relevancy 1473. The AAA may then retrieve one or more interest group keywords and associated group categories from an AAA database 1475, and filter query results with the retrieved keywords 1477. The relevance of each of the interest group keywords among the query results may then be determined 1479, followed by the average relevancy of all interest group keywords 1481. The query results may then be sorted, such as in order of relevancy associated with each interest group keyword, and provided for display 1483.

Figure 14C:
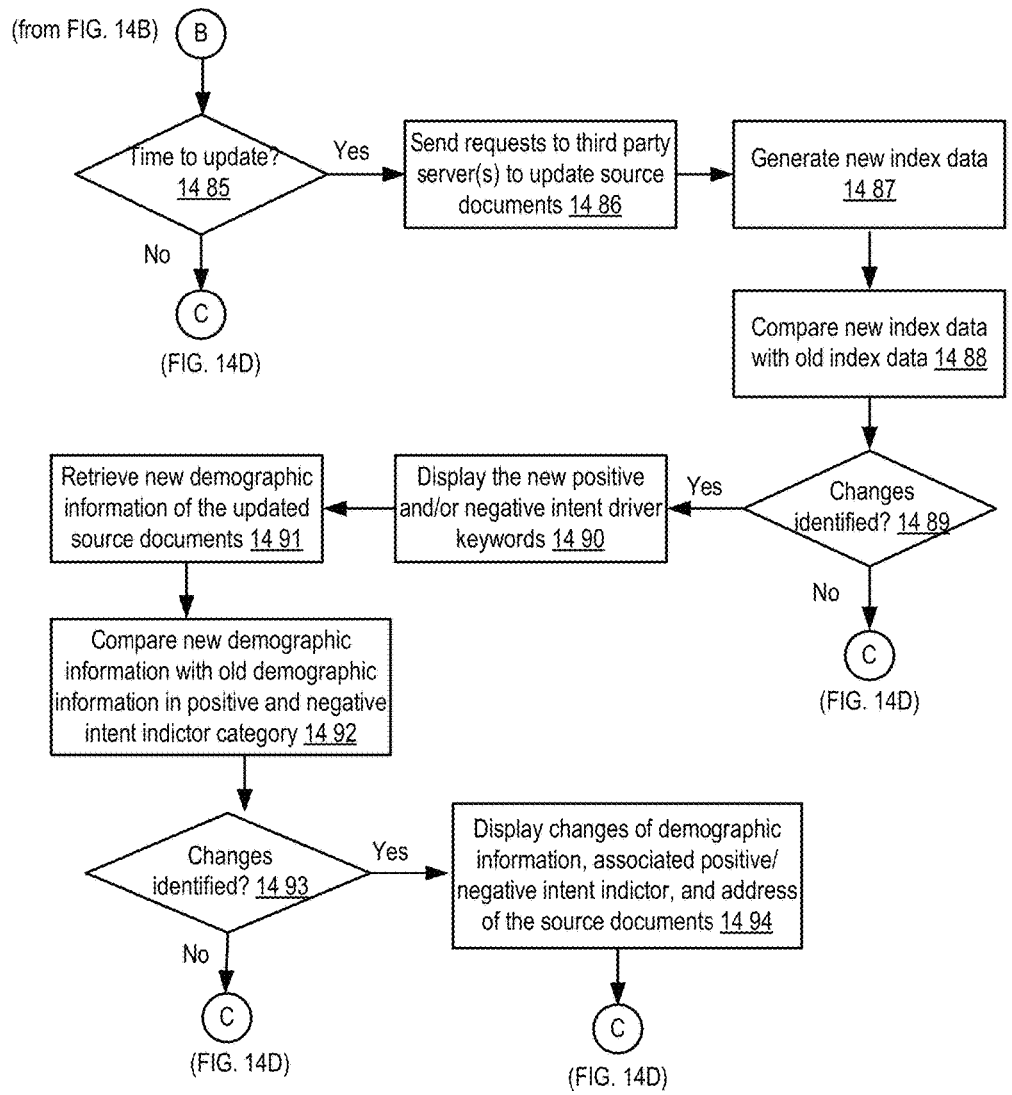

The AAA may proceed to 1485 in FIG. 14C, whereby a determination is made as to whether an update to index information, source documents, query results, and/or the like is desired 1485. If not, then the AAA may proceed to 1495 in FIG. 14D. Otherwise, if an affirmative determination is made at 1485, the AAA may send one or more requests to one or more third party servers to update source documents 1486. New index data may be generated based on the updated source documents 1487 and compared with existing index data 1488 to determine if any changes exist 1489. If not, then the AAA may proceed to 1495 in FIG. 14D. Otherwise, if changes exist, new positive and/or negative intent indicators may be displayed in the user interface 1490. The AAA may further retrieve new demographic information associated with the updated source documents 1491 and compare it with existing demographic information in each positive and/or negative intent indicator category 1492. A determination may be made as to whether any changes can or have been identified 1493 and, if not, the AAA may proceed to 1495 in FIG. 14D. Otherwise, changes of demographic information, associated positive and/or negative intent indicators, and/or addresses of the source documents may be displayed 1495.

Figure 14D:
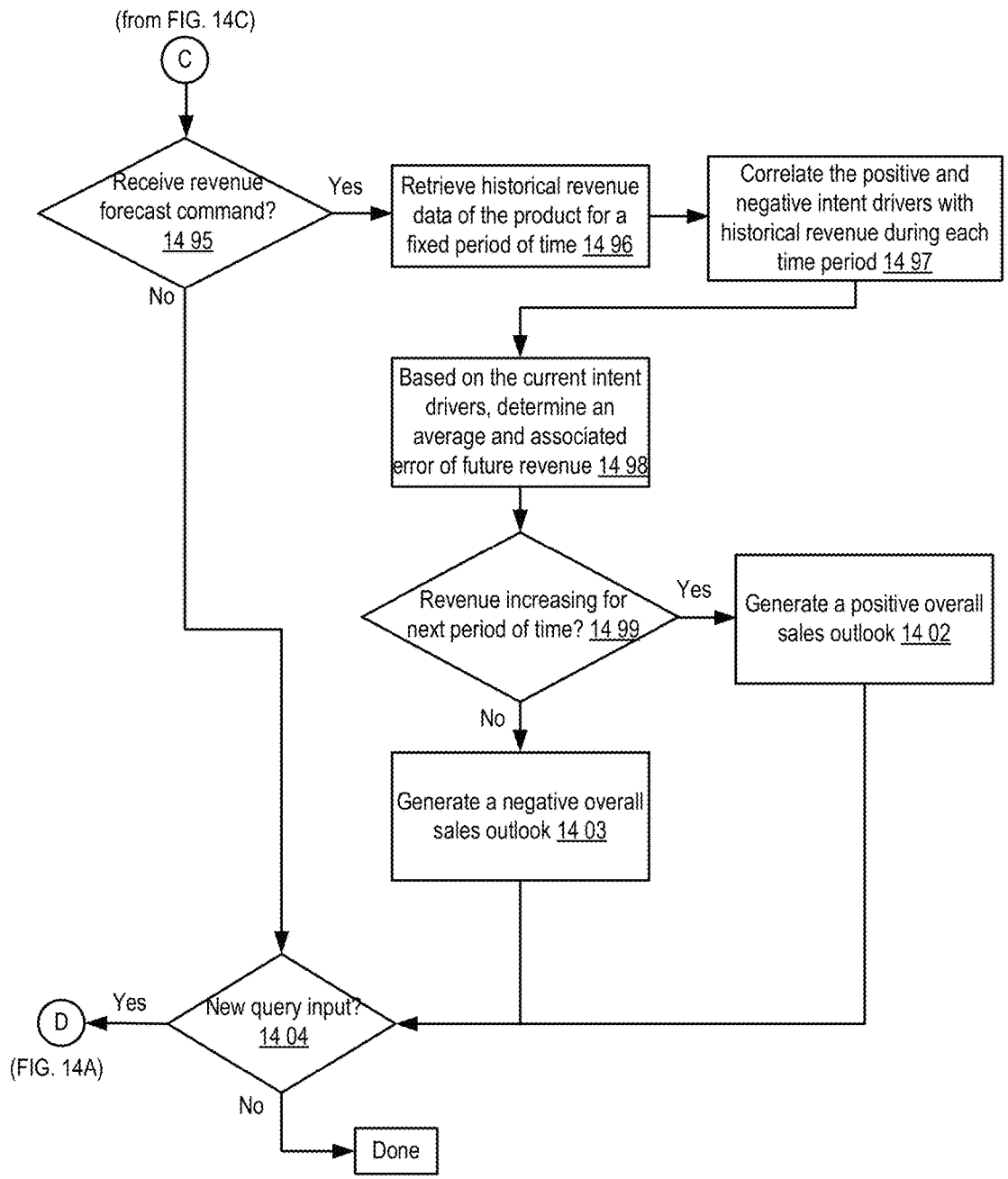

The AAA may proceed to 1495 in FIG. 14D, whereby a determination may be made as to whether a revenue forecast command is received. If not, the AAA may proceed to 1404. Otherwise, if a revenue forecast command has been received, the AAA may retrieve historical revenue data associated with the queried product for a particular (e.g., fixed) period or periods of time 1496. In some implementations, the period of time for which historical revenue data is retrieved may be specified as part of the revenue forecast command. The AAA may then correlate positive and/or negative intent drivers with historical revenue data associated with one or more corresponding time periods 1497. In one implementation, such correlation may be based on occurrences of intent drivers and historical revenue information in a given document, related collection of documents, and/or the like and/or on regression analysis associated therewith. Leveraging the determined correlation, the AAA may inspect current intent drivers (e.g., associated with a current and/or recent period of time) and determine projected and/or future revenue, such as by determining an average estimated revenue, an estimate error interval, and/or the like 1498. In one implementation, these determinations may be based on one or more statistical regression models derived from determined correlations of intent drivers with historical revenue data. A determination may be made as to whether the estimated revenue represents an increase over one or more prior periods 1499 and, if so, a positive overall outlook indicator may be generated 1402 and/or provided. Otherwise, a negative overall outlook indicator may be generated 1403 and/or provided. In one implementation, the determination of revenue increase may be made by comparing an average estimated and/or forecast revenue, estimated error interval, and/or the like with associated prior revenues and/or estimated revenues. In some implementations, a positive and/or negative outlook indicator may comprise a database record, a report, a user interface element, and/or the like. A determination may be made as to whether a new query input has been received 1404 and, if so, the AAA may return to 1401 in FIG. 14A. Otherwise, a revenue forecast process may conclude. Although, the operation of the AAA in connection with FIGS. 14A-D is described in terms of revenue forecasting, it is to be understood that this choice is for illustrative purposes, and that a variety of other quantities may be forecast in a similar manner, such as but not limited to costs, profits, prices, demand levels, supply levels, and/or the like.

Figure 15:
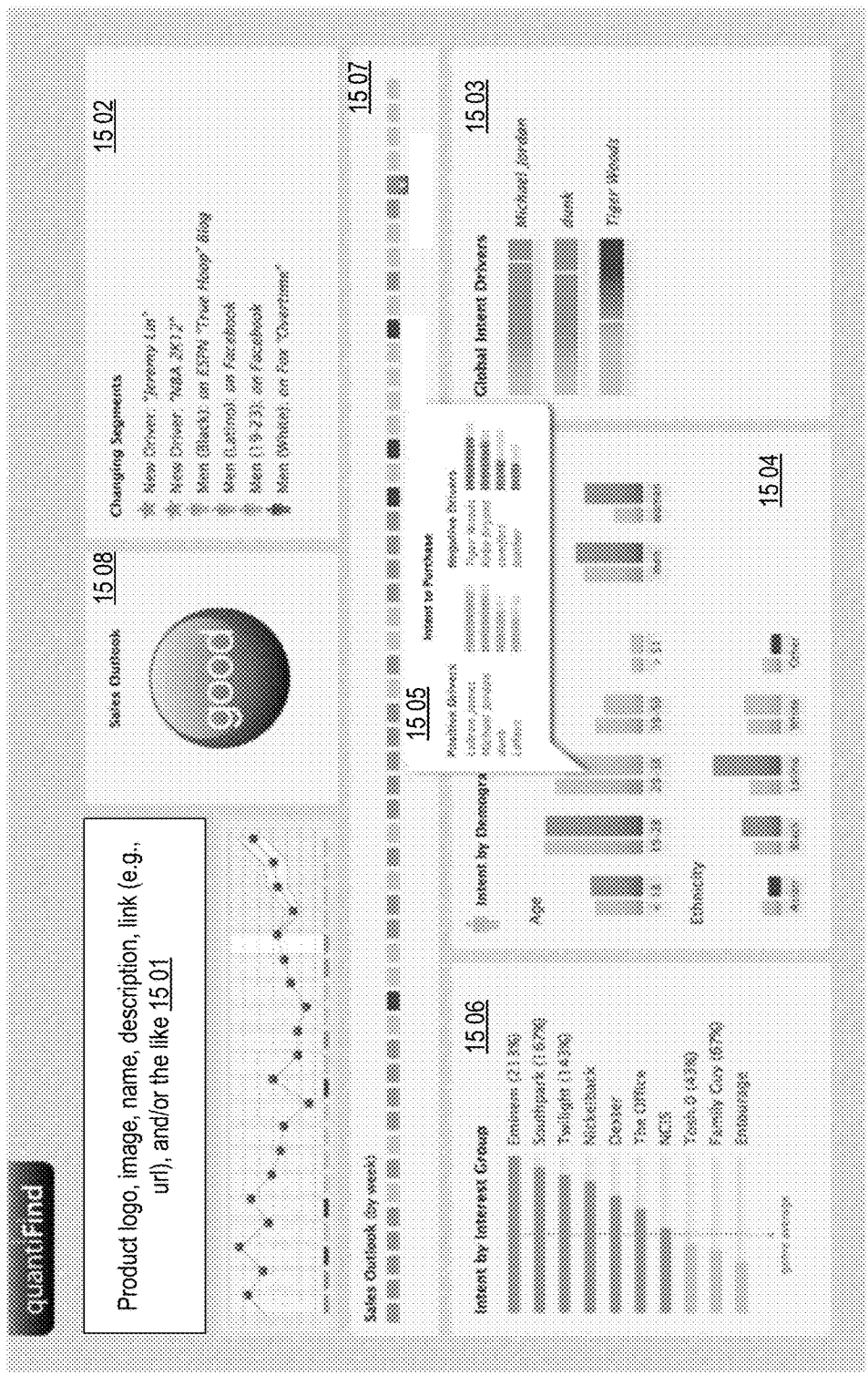
FIG. 15 shows an implementation of user interface for revenue forecasting in one embodiment of AAA operation.

FIG. 15 shows an implementation of user interface for revenue forecasting in one embodiment of AAA operation. An interface similar to that shown in the example of FIG. 15 may be provided for display to a user in connection with the process depicted in FIGS. 14A-D and/or in connection with a product query, revenue forecast inquiry, and/or the like. In one implementation, an interface area may include product information, logo, picture, description, and/or the like product information associated with a product query 1501. The area may further include a graph or other illustration depicting past, present and/or forecast revenue, estimated error intervals, and/or the like. In one implementation, an interface area may be displayed which includes a sales outlook indicator 1508, such as may be generated according to FIG. 14D. The interface may further be configured with indicators of prior and/or historical outlook data 1507, such as according to a color-coding scheme and/or other visual cues to reflect outlook values in various time periods. In one implementation, an interface area may be displayed which includes indications of segments, demographic groups, intent drivers, and/or the like associated with the query terms for which a change has occurred in the significance of the segment, group, driver, and/or the like in impacting, for example, the revenue associated with the queried item 1502. In one implementation, an interface area may be displayed which includes positive and/or negative intent indicator trends, such as resolved according to demographic categories, age groups, ethnicities, geographic affiliations, group affiliations, and/or the like 1504. In one implementation, the interface may be configured to react to a click, mouse-over, and/or the like engagement of an area and/or interface element corresponding to a demographic group to display a pop-up window or the like interface element depicting positive and/or negative intent drivers, reflecting the factors that are significant for that demographic group to drive purchases or to drive against purchases of the queried item 1505. In one implementation, an interface area may be displayed which includes global intent drivers 1503, such as may reflect intent drivers determined to be most significant across all or a subset of demographic groups in driving towards or away from purchases of the queried product.

Figure 16:
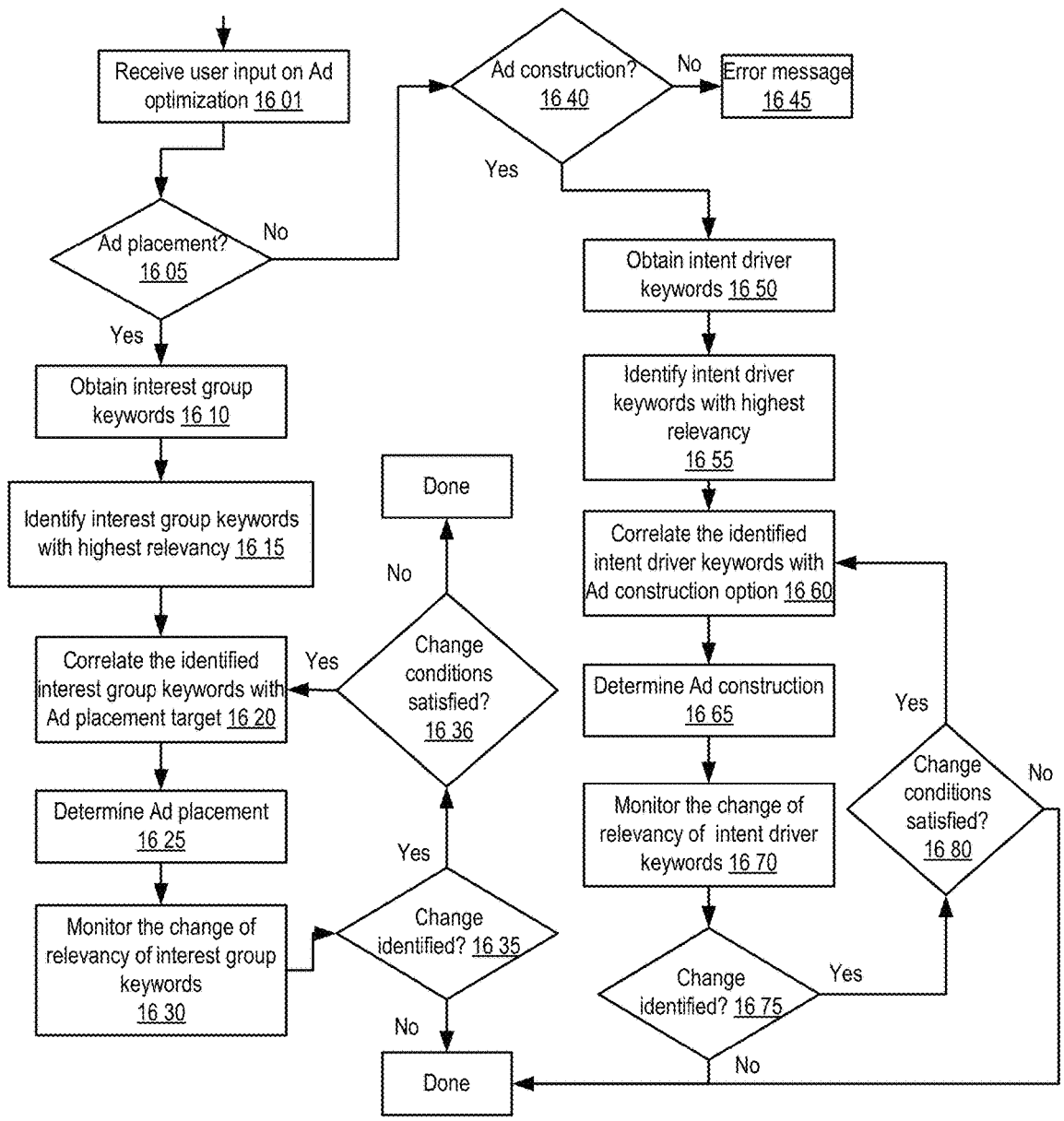
FIG. 16 shows an implementation of logic flow for advertisement optimization in one embodiment of AAA operation.

FIG. 16 shows an implementation of logic flow for advertisement optimization in one embodiment of AAA operation. A process similar to that depicted in the example of FIG. 16 may be employed by the AAA in some implementations to optimize the configuration, purchasing and/or placement of advertisements according to trends, intent drivers, and/or the like identified from real time or near real time updates to social media data. User input pertaining to advertising optimization may be received 1601, such as an indication as to whether the user wishes to optimize advertising placement or advertising construction. For example, a determination may be made as to whether the received input indicates a desire to optimize advertising placement 1605. If not, then a determination may be made as to whether the received input indicates a desire to optimize advertising construction 1640. If this determination is also negative, the AAA may provide an error message 1645, such as to indicate to the user that an acceptable optimization input has not been received. In alternative implementations, the AAA may be configured to admit other optimization inputs and/or routines.

If an affirmative determination is reached at 1605, the AAA may obtain interest group keywords associated with a given advertisement, product, service, and/or the like 1610 and identify one or more such keywords with highest relevancy 1615, such as according to the significance of those keywords in determining the likelihood of interest of a given group (e.g., based on the correlation between the keywords and one or more interest indicators). Interest group keywords identified as most relevant and/or significant may be correlated with one or more advertising placement targets 1620, such as according to a look-up table, rule framework, and/or the like. Ad placement may then be determined and/or effectuated according to the correlated ad placement targets 1625. In one implementation, ad placement targets and/or ad placement actions may pertain to the timing and/or location of an advertisement (e.g., placement of a web-based advertisement on a particular webpage within a particular range of times). The AAA may subsequently monitor the change of relevancy and/or significance of interest a group keywords 1630 and, if a change is identified 1635, may make a determination as to whether one or more change conditions have been satisfied 1636. For example, in one implementation, a change determination may comprise comparing a degree of change of a relevancy and/or significance score (e.g., correlation value) to a threshold value to determine if the threshold has been violated. If the change condition is satisfied at 1636, then AAA may return to 1620. Otherwise, if the change condition is not satisfied, or if no change is identified at 1635, the ad optimization process may conclude.

If an affirmative determination is reached at 1640, indicating a desired ad construction optimization, the AAA may obtain intent driver keywords associated with a given advertisement, product, service, and/or the like 1650, and may identify keywords with highest relevancy 1655, such as according to the significance of those keywords in impacting the efficacy, visibility, and/or the like of an advertisement and/or the likelihood of purchase of and/or interest in an associated product or service (e.g., based on correlations between the keywords and indicators of advertisement efficacy, customer interest and/or purchase consummation derived from the document corpus). Intent driver keywords identified as most relevant and/or significant may be correlated with one or more advertising construction options 1660, such as according to a look-up table, rule framework, and/or the like. In one implementation, an advertising construction option may pertain to the configuration, arrangement, selection, color, highlighting, textual content, and/or the like of advertising features, such as advertising copy, images, sounds or audio content, states of animation, video content, and/or the like. In one implementation, an advertising construction option may be configured as an XML document. Ad configuration may then be determined and/or effectuated according to the correlated ad construction option 1665. The AAA may subsequently monitor the change of relevancy and/or significance of intent driver keywords 1670 and, if a change is identified 1675, may make a determination as to whether one or more change conditions have been satisfied 1680. For example, in one implementation, a change determination may comprise comparing a degree of change of a relevancy and/or significance score to a threshold value to determine if the threshold has been violated. If the change condition is satisfied at 1680, then AAA may return to 1660. Otherwise, if the change condition is not satisfied, or if no change is identified at 1675, the ad optimization process may conclude.

In some embodiments, the AAA may be configured to automatically analyze real-time social media data feeds and generate and/or implement one or more advertising, marketing, political canvassing and/or the like strategies. For example, the AAA may be configured to recognize and/or target demographic and/or customer interest groups having high or highest elasticity to drive revenue lift. This may be achieved, in one implementation, by referencing intent driver categories sorted according to revenue correlation (432 in FIG. 4D), the intent driver category with highest correlation to revenue (434), and/or elasticity determinations associated therewith, such as may be sorted or grouped according to demographic categories, customer characteristics, and/or the like. In one implementation, revenue lift elasticity of a particular group may represent the expected degree of customer response (e.g., in terms of sales) for a particular system action, as determined according to observed correlations between revenue and intent drivers in a document corpus, such as including one or more social media data feeds.

The AAA may also be configured to recognize particular messages and/or message elements correlated with revenue and/or revenue lift, which are associated with driving customers within a particular target group towards desired action, such as the optimal generation of revenue. Message recognition may, in some implementations be based on the natural language analysis of content from resources such as online comments, social media chatter (e.g., within a particular friend network, demographic cross section, across an entire social media web service membership, and/or the like), test or training document collections, and/or the like, as well as historical training thereover. For example, the AAA may identify which messages drive one or more demographic groups towards purchasing a particular product according to the natural language analysis of social media data feeds associated with consummation of product purchases for that product or associated products. In one implementation, the AAA may employ advertising construction optimization, such as according to the example embodiment shown in FIG. 16, to identify intent driver keywords with highest relevancy to driving elastic target groups towards desired actions, correlate identified intent driver keywords with advertisement construction options, and develop and place advertisements based on those options with real time update capability according to continuous analysis of a time-varying data feed. Intent driver keyword identification, ad construction option correlation, and/or available ad construction options may be resolved uniquely for different target groups, customer characteristics, data feed sources, and/or the like. Advertisement generation by the AAA may, in various embodiments, include a variety of different advertising formats, such as but not limited to: display advertising, search engine result previews, social media comments, social media chatter, microblogging, emails, content marketing, political messaging, public awareness campaigning, audio or video content creation, and/or the like.

The AAA may further be configured to discover inventory targets, such as for the placement of advertisements of various formats, including AAA generated advertisements and/or third party advertisements associated with particular tags, indexing, and/or the like. Inventory targets may include, but are not limited to, television and/or radio programs, podcasts, blogs and/or particular blog entries, social media web services, websites, electronic billboards, email lists, search engine result pages, geographic locations, times of day, times of year, types of media and/or the like according to determined correlations between inventory target placements and revenue lift resolved and/or averaged across various demographic groups and/or customer characteristics. In one implementation, the AAA may employ advertising placement optimization, such as according to the example embodiment shown in FIG. 16, to identify intent driver keywords with highest relevancy to driving elastic target groups towards desired actions, correlate identified intent driver keywords with inventory targets (1620), and place advertisements according to those correlated targets, with real time update capability according to continuous analysis of one or more time-varying data feeds. Intent driver keyword identification, ad placement target correlation, and/or available ad placement target options may be resolved uniquely for different target groups, customer characteristics, data feed sources, and/or the like.

In one implementation, the AAA may be configured to automatically generate and/or place advertisements without ongoing user interaction, such as based on continuously and/or periodically monitored data feeds. Automatic ad generation and placement may be coordinated to direct advertisements to targeted demographic and/or customer characteristic groups with maximal impact and advertising efficacy. In another implementation, the AAA may be configured to present selected advertising generation options in connection with selected inventory targets to a user interface, wherein a user may connect generation options to inventory targets (e.g., by drag-and-drop) to initiate an automated process of advertisement generation and placement according to the specified relationships. In one implementation, the AAA may be configured to determine a price associated with a particular advertisement generation and/or inventory target placement strategy, such as by an internal pricing model or database and/or by providing strategy parameters to one or more third party systems configured to return advertising pricing information. A user, having the opportunity to inspect displayed strategy option pricing, may be provided with an interface button initiating automated purchase, generation and/or placement of advertisements according to one or more system designed strategies selected by the user. In another implementation, the AAA may automatically inspect displayed strategy option pricing and initiate purchase, generation and/or placement of advertisements, such as based on one or more defined rules (e.g., purchase the advertisement when its price is less than a threshold).

In some implementations, the AAA may be configured with an API having commands for automatically populating fields within the API of a digital service provider associated with an advertising platform. Automatic population may be effectuated in the service provider API, for example, by a user dragging an advertisement generation option onto an inventory target. In another implementation, automatic population may be effectuated by a user dragging an advertisement generation option or inventory target onto a target demographic group, to initiate an automated advertisement consummation (i.e., inventory target selection for dropped advertisement generation option, and vice versa) seeking to maximize target demographic impact. In another implementation, automatic population may be effectuated by a user dragging a creative advertisement component (e.g., image, video, audio, copyrighting, slogan, and/or the like) onto a target demographic, initiating an automated process of advertisement generation and/or selection as well as inventory target identification, to create and place advertisements with maximal target group impact.

In some implementations, AAA data feed resources may be grouped in order to target particular associated demographic groups and/or to amplify model signal associated with particular target groups and/or data feed resource characteristics. For example, in one implementation, advertisements associated with children's programming may be aggregated as input and training to the AAA for driving generation and/or placement of children's advertising. In another implementation, advertisement generation options and/or inventory targets may be grouped according to shared characteristics, demographic associations and/or AAA determined target group correlations, such that advertising generation and/or placement may be achieved on a group-wide basis, promoting message consistency and saturation of a particular inventory target group. Groupings of advertisement generation options and/or inventory targets may be updated according to real-time and/or periodically updated analysis of data feeds. In one implementation, data feed resource grouping and/or advertisement placement option and/or inventory target groupings may be automatically associated with and/or implemented for interest groups within a social graph that are correlated with the grouping tags and/or characteristics. In one implementation, data feed resource grouping and/or advertisement placement option and/or inventory target groupings may be limited to the context of particular social groups, social networks, social graphs, interest graphs, targeted subsets thereof, and/or the like, thus allowing better targeting of advertisements within social groups. Such groupings may also allow the AAA to recognize core fan base, ethnic, geographic, family status, demographic, customer characteristic and/or other designations on an aggregate basis, thus avoiding the need for personalized information at the individual level.

In some implementations, the AAA may be configured to monitor, analyze and store content of and/or references to naturally generated social media chatter, such as microblogging entries, comments, blog entries, social media feed entries, links, social news website entries, and/or the like. Stored messages may then be accessed according to demographic targeting strategies, including desired messaging content and/or characteristics, and provided to inventory targets according to desired demographic and/or customer characteristic group impact. Analyzed social media chatter may be evaluated, tagged, categorized, and/or the like according to one or more criteria, including, but not limited to, message content, placement, exposure (e.g., the number of message recipients, according to a social network influence score associated with the message originator), originator identity, geographic association, subject matter, social network position, group affiliation, message characteristics, and/or the like. In one implementation, messages matching a threshold number of target characteristics for a particular demographic and/or customer characteristic group may qualify for distribution to those groups by the AAA. In one implementation, the AAA may act as an automated advertisement reallocation engine, converting user-generated content from an original form into one or more other forms according to expected target group impact (e.g., to maximize the effect of a message generated originally in a particular social media service). In addition to and/or instead of captured user-generated social media chatter, the AAA may also be configured to maintain a pool of meta-data tagged creative content. Stored and/or user-generated creative content tagged and/or categorized by the AAA may be employed by any of the agencies and/or interfaces described above to select and place advertisements with inventory targets according to desired impact, where the meta-data tags for selected content most closely match the desired messaging. In another implementation, advertising content may be fixed while an advertisement configuration template (e.g., ad generation and/or placement template) may be selected according to desired impact, such as where meta-data tags for the templates most closely match the desired impact.

In some embodiments, the AAA may be configured to provide automated marketing feedback, such as may be used for advertisement generation/placement optimization, reports, and/or the like. For example, the AAA and/or one or more AAA configured client modules may monitor click-through-rates, mouse-over rates, views, purchase consummation, sales, revenues, user feedback levels, and/or the like associated with advertisement content, configuration, placement, timing, and/or the like and provide real-time feedback to AAA systems for updated advertisement generation and/or placement. By monitoring the success characteristics of AAA generated and/or placed advertising, AAA feedback components may continuously update and improve advertisement characteristics to yield desired success characteristics with whatever demographic and/or customer characteristic groups are targeted. In some implementations, AAA configured modules may be provided as client software or standalone components to advertisers for message generation, message placement, advertisement success monitoring, feedback implementation, and/or the like.

In one implementation, the AAA may be configured to receive as input one or more demographic and/or customer characteristic group target profiles, indicating a distribution across such groups to which advertisement generation and/or placement resources should be allocated, and automatically initiating an advertisement generation and/or placement strategy according to those profiles. Profiles may, in one implementation, comprise XML documents correlating resource allocation levels with demographic categories, customer characteristics, and/or the like. As target group profiles are updated in real time according to evolving advertisement targeting strategies, advertisement generation and/or placement will also be updated to reflect those strategies. Updating of advertisement generation and/or placement according to updated target profiles, according to evolving data feed content, and/or according to advertising feedback may, in various implementations, be performed contemporaneously, in succession, independently, in coordination, and/or in any combination or order.

The AAA may include one or more user interfaces for marketing strategy recommendation in embodiments of AAA operation. Such an interface may display characteristics of one or more products such as, in the case where the products are movies, movie titles and release date information, as well as related images, posters, trailers, links, related tags or categories, additional information and/or the like. The interface may also include displays of demographic information reflecting, for example, demographic group interest and/or revenue correlations with the displayed product, the proportion of various demographic groups demonstrating interest in the displayed product, and/or response elasticity for each demographic group with respect to the displayed product (e.g., the expected rise in revenue from sales of the product for a given expenditure of money, advertising resources, and/or the like directed towards each demographic group). The interface may further be configured to display interest groups associated with the displayed products, which may reflect, for example, interest group interest and/or revenue correlations with the displayed product and/or response elasticity for each interest group with respect to the displayed product (e.g., the expected rise in revenue from sales of the product for a given expenditure of money, advertising resources, and/or the like directed towards each interest group). Based on evaluation of revenue correlation and/or elasticity of demographic and/or customer characteristic groups, interest groups, and/or the like as well as identification of advertisement generation and/or placement targets associated therewith, the AAA may further provide recommendations for and/or automatically implement marketing strategies according to identified target groups, advertisement generation options, inventory targets, and/or the like. The AAA may include a display of strategic recommendations, for example instructing a user to strongly push the humorousness of movie characters based on the determination that conversations related to that humorousness are driving intent to purchase the displayed product among two groups or segments or interest. In one implementation, the AAA may indicate to "strongly push" a marketing strategy initiative where a determination is made that such strategy is directed to one or more target groups having maximal or high elasticity with respect to revenue lift, and to "push" a marketing strategy where such strategy is directed to one or more target groups having secondary or lower elasticity with respect to revenue lift. In one implementation, the interface component may further indicate which target groups are driven by which advertisement generation options, inventory targets, creative content, and/or the like.

Figure 17:
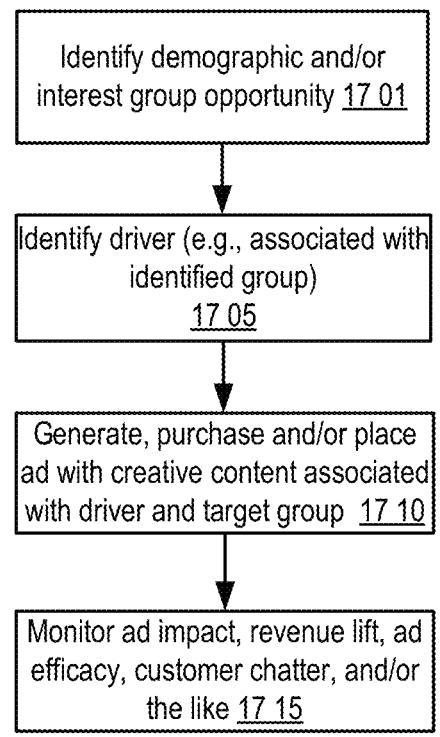
FIG. 17 shows an implementation of logic flow for advertisement generation, placement, and feedback tracking in one embodiment of AAA operation.

FIG. 17 shows an implementation of logic flow for advertisement generation, placement, and feedback tracking in one embodiment of AAA operation. In one implementation, the AAA may identify a demographic opportunity 1701, such as via the interface component discussed above. A demographic opportunity may, in one implementation, reflect a high or maximal elasticity of a particular target group with respect to revenue lift for one or more products of interest. High elasticity may be determined, for example, by comparing elasticity to a fixed or variable threshold value, an average elasticity, and/or the like. The AAA may further identify one or more interest drivers associated with targeted demographic opportunities 1705, such as may represent the message content, generation options, placement options, inventory targets, and/or the like determined to most strongly drive target group interest and/or revenue lift with respect to the one or more products of interest. Advertisement creative content, advertisement generation options, placement options, inventory targets, and/or the like may then be selected and/or purchased 1710 based on association with the one or more intent drivers identified at 1705. Such association may be based, in various implementations, on content and/or template metadata, real-time evaluation of association rules, and/or the like. The AAA may further be configured to track feedback, revenue impact, interest impact, and/or the like advertisement efficacy 1715, as well as provide such data for display, update marketing strategies and/or strategy recommendations based on feedback and/or updated analysis, and/or the like.

Figure 18:
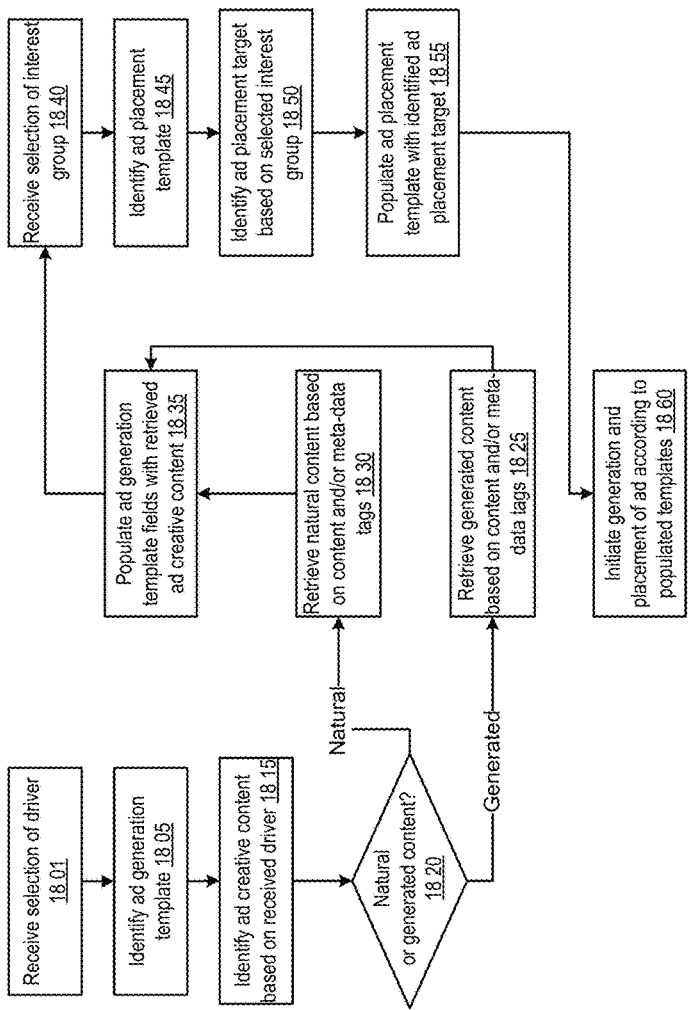
FIG. 18 shows an implementation of logic flow for self service social advertisement activation in one embodiment of AAA operation.

FIG. 18 shows an implementation of logic flow for self-service social advertisement activation in one embodiment of AAA operation. Upon receipt of an indication of selection of an intent driver 1801, the AAA may identify one or more ad generation templates 1805. In one implementation, an ad generation template may comprise a plurality of fields associated with and/or admitting various ad generation components such as, but not limited to, image, title, text, video, audio, URL, meta-data tags, related content, and/or the like. The AAA may also identify ad creative content based on the received driver 1815, whereby a determination may be made as to whether natural or generated content is to be used 1820. In one implementation, natural content may comprise organic and/or user-generated social media chatter and/or other user-generated content, such as may be retrieved from one or more social media web services (e.g., via social media API commands), while generated content may comprise creative content created by the AAA and/or one or more third party agencies. Generated content and/or natural content may be retrieved at 1825 and 1820 respectively, such as based on content-associated meta-data tags, content analysis, and/or the like. The AAA may then populate one or more fields of the ad generation template with retrieved ad content 1835. In one implementation, a threshold number of ad generation template fields must be filled by retrieved creative content before an ad may be generated based on that ad generation template. The threshold number may, in one implementation, vary for different ad generation templates and/or groups of templates.

The AAA may further receive selection of one or more interest groups 1840 and identify one or more ad placement templates 1845. In one implementation, an ad placement template may comprise a plurality of placement fields directing selection of ad placement targets. Ad placement template fields may include, but are not limited to, target broadcast resources, URLs, inventory target categories and/or subcategories, demographics, geographic criteria, interest, audience identifiers, and/or the like. Ad placement target information may be identified based on the received interest group selection 1850 and used to populate one or more fields of the ad placement template. In one implementation, a threshold number of ad placement template fields must be filled by identified target information for the ad placement template to place an ad according to that information. The threshold number may, in one implementation, vary across ad placement templates and/or groups of ad placement templates. The AAA may identify ad placement targets and/or target parameters 1850, such as based on the received interest group selection. In one implementation, ad placement target information may be associated with meta-data tags, categories and/or the like, which may be queried and/or otherwise inspected based on one or more indications of the received interest group selection. The AAA may then populate the ad placement template with the identified ad placement target and/or target information 1855. In one implementation, ad generation templates and/or ad placement templates may be configured as XML files. In one implementation, the ad generation template and the ad placement template may be integrated into a single, unified template.

The AAA may then initiate and/or direct generation and/or placement of an advertisement according to one or both of the ad generation template and the ad placement template 1860. In one implementation, the AAA may itself effectuate generation of an advertisement according to the populated ad generation template, and provide the generated advertisement to one or more third party inventory targets and/or place the advertisement itself in one or more internal and/or locally accessible broadcast repositories. In another implementation, the AAA may provide populated ad generation and/or placement templates to one or more third party agencies for use in ad generation and/or placement.

AAA interface components may be engaged by a user, in one implementation, to facilitate user input to and/or initiate automatic population of an advertisement template with content according to selected intent drivers and/or demographic and/or customer characteristic target groups. In one implementation, a click received on an intent driver may initiate automatic population of a creative advertisement template according to content associated with the selected intent driver. In one implementation, content populating an advertisement template and/or otherwise distributed by the AAA may comprise and/or be derived from natural and/or user-generated social media chatter, such as microblogging entries, social media wall posts, blog entries, data feeds, and/or the like. Such content may be analyzed and tagged and/or categorized, as discussed above, to facilitate use in relation to one or more intent drivers, demographic groups, customer characteristic groups, inventory targets, and/or the like. In another implementation, the AAA may access creative content stored in a creative content library according to meta-data tags associated with that content, whereby meta-data tags indicate associations determined to exist in analyzed data feeds between those tags and intent drivers, demographic groups, customer characteristic groups, and/or the like. The AAA may further include interface components which may be engaged to facilitate user input to and/or initiate automatic population of a target advertisement template, which may direct the placement of AAA managed advertisements. In one implementation, an advertising target template may include fields to receive information regarding target audiences (e.g., demographic and/or customer characteristic groups) including, but not limited to, target geographic areas, age ranges and/or exact age values, gender, interests, advertisement placement target tags and/or categories, and/or the like. Target characteristics specified according to a template may instruct the AAA to direct advertisements to inventory targets having meta-data tags and/or otherwise associated with the specified target characteristics. In one implementation, a user clicking on an interest group via an AAA user interface may cause display of the target template and/or may facilitate user-input to and/or initiate automatic population of that template. For example, the AAA may be configured to identify and automatically select target template field values and/or generate field entries associated with a particular interest group selection.

AAA Controller

Figure 19:
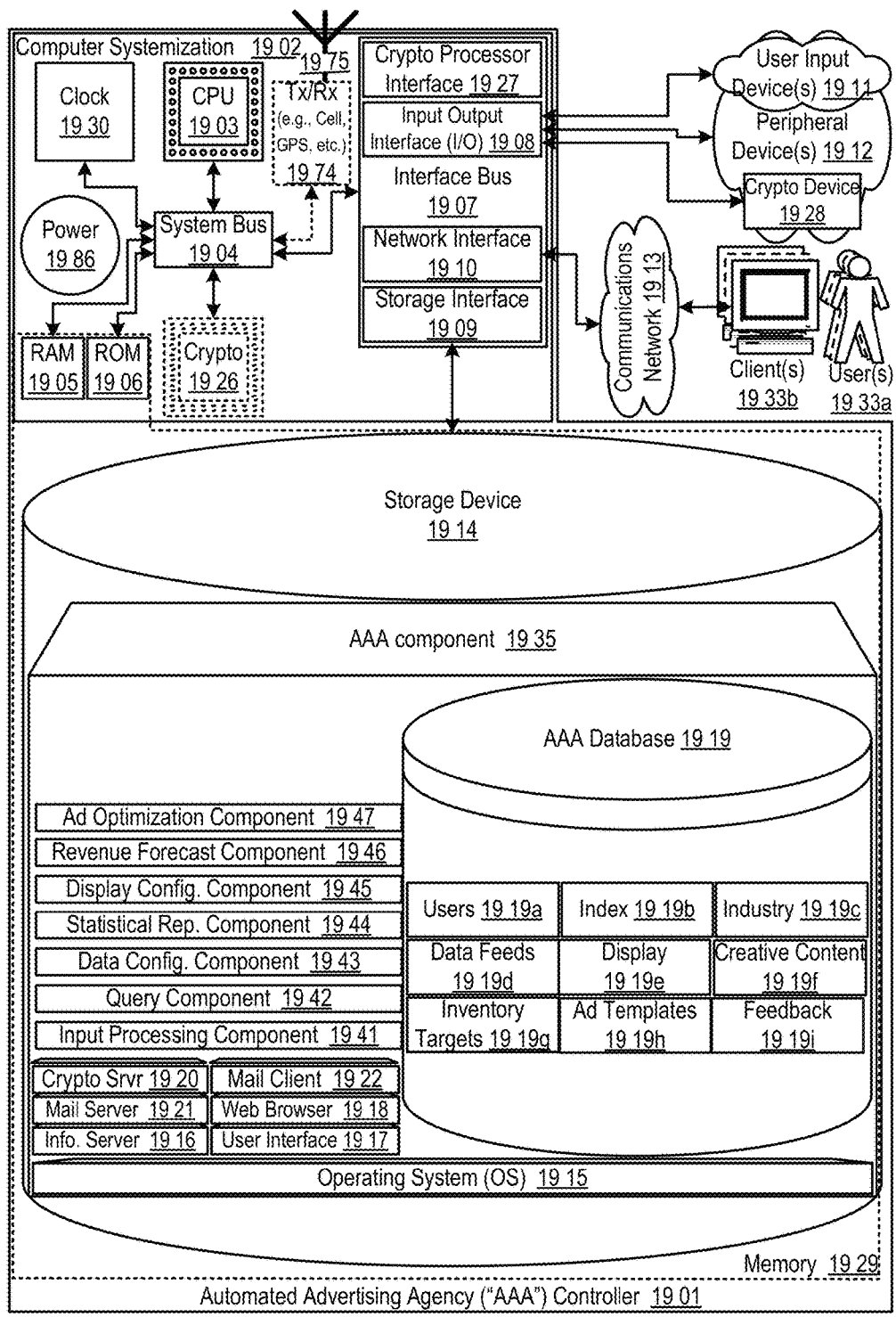
FIG. 19 shows a block diagram illustrating embodiments of a AAA controller.

FIG. 19 shows a block diagram illustrating embodiments of a AAA controller. In this embodiment, the AAA controller 1901 may serve to aggregate, process, store, search, serve, identify, instruct, generate, match, and/or facilitate interactions with a computer through market analysis technologies, and/or other related data.

Typically, users, which may be people and/or other systems, may engage information technology systems (e.g., computers) to facilitate information processing. In turn, computers employ processors to process information; such processors 1903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the AAA controller 1901 may be connected to and/or communicate with entities such as, but not limited to: one or more users from user input devices 1911; peripheral devices 1912; an optional cryptographic processor device 1928; and/or a communications network 1913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The AAA controller 1901 may be based on computer systems that may comprise, but are not limited to, components such as: a computer systemization 1902 connected to memory 1929.

Computer Systemization

A computer systemization 1902 may comprise a clock 1930, central processing unit ("CPU(s)" and/or "processor(s)" (these terms are used interchangeable throughout the disclosure unless noted to the contrary)) 1903, a memory 1929 (e.g., a read only memory (ROM) 1906, a random access memory (RAM) 1905, etc.), and/or an interface bus 1907, and most frequently, although not necessarily, are all interconnected and/or communicating through a system bus 1904 on one or more (mother)board(s) 1902 having conductive and/or otherwise transportive circuit pathways through which instructions (e.g., binary encoded signals) may travel to effectuate communications, operations, storage, etc. The computer systemization may be connected to a power source 1986; e.g., optionally the power source may be internal. Optionally, a cryptographic processor 1926 and/or transceivers (e.g., ICs) 1974 may be connected to the system bus. In another embodiment, the cryptographic processor and/or transceivers may be connected as either internal and/or external peripheral devices 1912 via the interface bus I/O. In turn, the transceivers may be connected to antenna(s) 1975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing AAA controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the AAA controller and beyond through various interfaces. Should processing requirements dictate a greater amount speed and/or capacity, distributed processors (e.g., Distributed AAA), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the AAA may be achieved by implementing a microcontroller such as CAST's R8051XC2 microcontroller; Intel's MCS 51 (i.e., 8051 microcontroller); and/or the like. Also, to implement certain features of the AAA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the AAA component collection (distributed or otherwise) and/or features may be implemented via the microprocessor and/or via embedded components; e.g., via ASIC, coprocessor, DSP, FPGA, and/or the like. Alternately, some implementations of the AAA may be implemented with embedded components that are configured and used to achieve a variety of features or signal processing.

Depending on the particular implementation, the embedded components may include software solutions, hardware solutions, and/or some combination of both hardware/software solutions. For example, AAA features discussed herein may be achieved through implementing FPGAs, which are a semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the AAA features. A hierarchy of programmable interconnects allow logic blocks to be interconnected as needed by the AAA system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the AAA may be developed on regular FPGAs and then migrated into a fixed version that more resembles ASIC implementations. Alternate or coordinating implementations may migrate AAA controller features to a final ASIC instead of or in addition to FPGAs. Depending on the implementation all of the aforementioned embedded components and microprocessors may be considered the "CPU" and/or "processor" for the AAA.

Power Source

The power source 1986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1986 is connected to at least one of the interconnected subsequent components of the AAA thereby providing an electric current to all subsequent components. In one example, the power source 1986 is connected to the system bus component 1904. In an alternative embodiment, an outside power source 1986 is provided through a connection across the I/O 1908 interface. For example, a USB and/or IEEE 1394 connection carries both data and power across the connection and is therefore a suitable source of power.

Interface Adapters

Interface bus(ses) 1907 may accept, connect, and/or communicate to a number of interface adapters, conventionally although not necessarily in the form of adapter cards, such as but not limited to: input output interfaces (I/O) 1908, storage interfaces 1909, network interfaces 1910, and/or the like. Optionally, cryptographic processor interfaces 1927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1909 may accept, communicate, and/or connect to a number of storage devices such as, but not limited to: storage devices 1914, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1910 may accept, communicate, and/or connect to a communications network 1913. Through a communications network 1913, the AAA controller is accessible through remote clients 1933b (e.g., computers with web browsers) by users 1933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed AAA), architectures may similarly be employed to pool, load balance, and/or otherwise increase the communicative bandwidth required by the AAA controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1910 may be used to engage with various communications network types 1913. For example, multiple network interfaces may be employed to allow for the communication over broadcast, multicast, and/or unicast networks.

Input Output interfaces (I/O) 1908 may accept, communicate, and/or connect to user input devices 1911, peripheral devices 1912, cryptographic processor devices 1928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1912 may be connected and/or communicate to I/O and/or other facilities of the like such as network interfaces, storage interfaces, directly to the interface bus, system bus, the CPU, and/or the like. Peripheral devices may be external, internal and/or part of the AAA controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the AAA controller may be embodied as an embedded, dedicated, and/or monitor-less (i.e., headless) device, wherein access would be provided over a network interface connection.

Cryptographic units such as, but not limited to, microcontrollers, processors 1926, interfaces 1927, and/or devices 1928 may be attached, and/or communicate with the AAA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VSI Technology's 33 MHz 6868; and/or the like.

Memory

Generally, any mechanization and/or embodiment allowing a processor to affect the storage and/or retrieval of information is regarded as memory 1929. However, memory is a fungible technology and resource, thus, any number of memory embodiments may be employed in lieu of or in concert with one another. It is to be understood that the AAA controller and/or a computer systemization may employ various forms of memory 1929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1929 will include ROM 1906, RAM 1905, and a storage device 1914. A storage device 1914 may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1929 may contain a collection of program and/or database components and/or data such as, but not limited to: operating system component(s) 1915 (operating system); information server component(s) 1916 (information server); user interface component(s) 1917 (user interface); Web browser component(s) 1918 (Web browser); database(s) 1919; mail server component(s) 1921; mail client component(s) 1922; cryptographic server component(s) 1920 (cryptographic server); the AAA component(s) 1935; and/or the like (i.e., collectively a component collection). These components may be stored and accessed from the storage devices and/or from storage devices accessible through an interface bus. Although non-conventional program components such as those in the component collection, typically, are stored in a local storage device 1914, they may also be loaded and/or stored in memory such as: peripheral devices, RAM, remote storage facilities through a communications network, ROM, various forms of memory, and/or the like.

Operating System

The operating system component 1915 is an executable program component facilitating the operation of the AAA controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the AAA controller to communicate with other entities through a communications network 1913. Various communication protocols may be used by the AAA controller as a subcarrier transport mechanism for interaction, such as, but not limited to: multicast, TCP/IP, UDP, unicast, and/or the like.

Information Server

An information server component 1916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective−) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the AAA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the AAA database 1919, operating systems, other program components, user interfaces, Web browsers, and/or the like.

Access to the AAA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the AAA. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the AAA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets)

similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1918 is a stored program component that is executed by a CPU. The Web browser may be a conventional hypertext viewing application such as Microsoft Internet Explorer or Netscape Navigator. Secure Web browsing may be supplied with 128bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the AAA enabled nodes. The combined application may be nugatory on systems employing standard Web browsers.

Mail Server

A mail server component 1921 is a stored program component that is executed by a CPU 1903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the AAA.

Access to the AAA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1922 is a stored program component that is executed by a CPU 1903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1920 is a stored program component that is executed by a CPU 1903, cryptographic component 1926, cryptographic processor interface 1927, cryptographic processor device 1928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the AAA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the AAA component to engage in secure transactions if so desired. The cryptographic component facilitates the secure accessing of resources on the AAA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The AAA Database

The AAA database component 1919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database: More precisely, they uniquely identify rows of a table on the "one" side of a one-to-many relationship.

Alternatively, the AAA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the AAA database is implemented as a data-structure, the use of the AAA database 1919 may be integrated into another component such as the AAA component 1935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1919 includes several tables 1919a-e. A Users table 1919a may include fields such as, but not limited to: user_ID, name, login, password, contact_info, query-history, settings, preferences, and/or the like. The user table may support and/or track multiple entity accounts on a AAA. An Index table 1919b may include fields such as, but not limited to: index_ID, index_type, data_feed_ID(s), industry_ID(s), term(s), data_type(s), data_type_value(s), snippet(s), source(s), author(s), date(s), and/or the like. An Industry table 1919c may include fields such as, but not limited to: industry_ID, data_feed_ID(s), index_ID(s), industry_name, industry_description, and/or the like. A Data Feeds table 1919d may include fields such as, but not limited to: data_feed_ID, data_feed_name, data_feed type, data_feed_content, source, author, date, data_feed_metadata, and/or the like. In one implementation, the data feed may be populated by a social media data feed (e.g., Facebook status updates, Twitter feed, and/or the like), by a market data feed (e.g., Bloomberg's PhatPipe, Dun & Bradstreet, Reuter's Tib, Triarch, etc.), and/or the like, such as, for example, through Microsoft's Active Template Library and Dealing Object Technology's real-time toolkit Rtt.Multi. A Display table 1919e may include fields such as, but not limited to: display_ID, display_configuration, settings, preferences, user_ID(s), industry_ID(s), and/or the like. A Creative Content table 1919f may include fields such as, but not limited to: content_ID, data_feed_ID(s), index_ID(s), industry_ID(s), user_ID(s), target_ID(s), template_ID(s), content_text, content_image(s), content_video(s), content_audio, meta-data_tags, content_categories, customer_associations, and/or the like. An Inventory Targets table 1919g may include fields such as, but not limited to: target_ID, data_feed_ID(s), index_ID(s), industry_ID(s), user_ID(s), content_ID(s), template_ID(s), target_address, target_policies, target_restrictions, meta-data_tags, target_categories, customer_associations, and/or the like. An Ad Templates table 1919h may include fields such as, but not limited to: template_ID, content_ID(s), target_ID(s), data_feed_ID(s), index_ID(s), industry_ID(s), user_ID(s), template_field(s), associated_data_field(s), template_format, meta-data_tags, content_categories, customer_associations, and/or the like. A Feedback table 1919i may include fields such as, but not limited to: feedback_ID, content_ID(s), target_ID(s), template_ID(s), data_feed_ID(s), index_ID(s), industry_ID(s), user_ID(s), comment(s), user_rating(s), click_through_rate(s), mouse_over_rate(s), view(s), sales_data, feedback_level(s), meta-data_tags, content_categories, customer_associations, and/or the like.

In one embodiment, the AAA database may interact with other database systems. For example, employing a distributed database system, queries and data access by search AAA component may treat the combination of the AAA database, an integrated data security layer database as a single database entity.

In one embodiment, user programs may contain various user interface primitives, which may serve to update the AAA. Also, various accounts may require custom database tables depending upon the environments and the types of clients the AAA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1919*a-e*. The AAA may be configured to keep track of various settings, inputs, and parameters via database controllers.

The AAA database may communicate to and/or with other components in a component collection, including itself, and/or facilities of the like. Most frequently, the AAA database communicates with the AAA component, other program components, and/or the like. The database may contain, retain, and provide information regarding other nodes and data.

The AAAs

The AAA component 1935 is a stored program component that is executed by a CPU. In one embodiment, the AAA component incorporates any and/or all combinations of the aspects of the AAA that was discussed in the previous figures. As such, the AAA affects accessing, obtaining and the provision of information, services, transactions, and/or the like across various communications networks. The features and embodiments of the AAA discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the AAA's features and facilities, and in many cases reduce the costs, energy consumption/requirements, and extend the life of AAA's underlying infrastructure; this has the added benefit of making the AAA more reliable. Similarly, many of the features and mechanisms are designed to be easier for users to use and access, thereby broadening the audience that may enjoy/employ and exploit the feature sets of the AAA; such ease of use also helps to increase the reliability of the AAA. In addition, the feature sets include heightened security as noted via the Cryptographic components 1920, 1926, 1928 and throughout, making access to the features and data more reliable and secure The AAA transforms source document, query, and, UI interaction inputs via AAA Input Processing 1941, Query 1942, Data Configuration 1943, Statistical Representation 1944, Display Configuration 1945, Revenue Forecasting 1946 and Advertisement Optimization 1947 components into UI intent driver, revenue forecasting, and, advertising optimization outputs.

The AAA component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo! User Interface; and/or the like), WebObjects, and/or the like. In one embodiment, the AAA server employs a cryptographic server to encrypt and decrypt communications. The AAA component may communicate to and/or with other components in a component collection, including itself, and/or facilities of the like. Most frequently, the AAA component communicates with the AAA database, operating systems, other program components, and/or the like. The AAA may contain, communicate, generate, obtain, and/or provide program component, system, user, and/or data communications, requests, and/or responses.

Distributed AAAs

The structure and/or operation of any of the AAA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the AAA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the AAA controller may be executing a PHP script implementing a Secure Sockets Layer ("SSL") socket server via the information server, which listens to incoming communications on a server port to which a client may send data, e.g., data encoded in JSON format Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_NET, SOCK_STREAM, o);
socket_bind($sock, $address, $port) or die('Could not bind to address');
socket_listen($sock);
$client=socket_accept($sock);
// read input data from client device in 1024 byte blocks until end of message do{
$input=" ";
$input=socket_read($client, 1024);
$data.=$input;
} while($input !=" ");
// parse data to extract variables
$obj=json_decode($data, true);
//store input data in a database
mysql_connect("201.408.185.132",$DBserver, $password); // access database server
mysql_select("CLIENT_DB.SQL"); // select database to append
mysql_query("INSERT INTO UserTable (transmission) VALUES ($data)); // add data to UserTable table in a CLIENT database
mysql_close("CLIENT_DB.SQL"); // close connection to database
?>

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/reference-guide295.htm and other parser implementations:

http://publib.boulder.ibm.com/infocenter/tivihelp/v2r1/index.jsp?topic=/com.ibm.IBMDI.doc/reference-guide259.htm all of which are hereby expressly incorporated by reference.

In order to address various issues and advance the art, the entirety of this application for AUTOMATED ADVERTISING AGENCY APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a AAA individual and/or enterprise user, database configuration and/or relational model, data type, data transmission and/or network framework, syntax structure, and/or the like, various embodiments of the AAA, may be implemented that enable a great deal of flexibility and customization. For example, aspects of the AAA may be adapted for providing interactive user interface reflecting market analyses and strategic planning; leveraging real-time or near-real time updating of social media data to automatically direct advertising purchasing, configuration and placement; retrieving numerical and/or non-numerical data, trends, relationships, and/or the like from a corpus of structured and/or unstructured electronic documents; identifying similarities and/or differences for selected characteristics related to query terms; pattern-based searching and/or query refinement based on graphical interface selections; open-ended and/or endpoint-constrained traversal-mode searching; highlighting and/or suppressing outliers and/or deviations from trends, averages, means, external data, and/or the like; alerts and/or associated actions based on occurrence of data points, trends, patterns, and/or the like; discrimination of relationships, trends, patterns, and/or the like; quantitative sentiment analysis; anonymization; automated optimization and/or refinement of search results based on result trends and/or patterns; and/or the like.

What is claimed is:

1. A processor-implemented method, comprising:
   determining a revenue lift elasticity by measuring a statistical correlation between at least one intent driver associated with a document corpus and at least one product revenue;
   identifying a target group for advertisement having the revenue lift elasticity higher than a threshold elasticity value;
   selecting at least one target intent driver associated with the target group based on correlations between the at least one intent driver and the target group identified in a document corpus;
   determining a messaging strategy based on the at least one intent driver; and
   initiating the messaging strategy, including
      selecting an advertisement configuration template, configured as at least one markup language file, based on a comparison of template metadata tags to the at least one target intent driver;
      selecting advertising content data based on the at least one target intent driver; and
      automatically populating the advertisement generation template with the advertising content data.

2. The method of claim 1, wherein the threshold elasticity value is the second highest revenue lift elasticity among a collection of candidate target groups.

3. The method of claim 1, wherein the target group comprises a demographic group.

4. The method of claim 1, wherein the target group is associated with a particular customer characteristic.

5. The method of claim 1, wherein the document corpus comprises at least one social media data feed.

6. The method of claim 5, wherein the at least one social media data feed is associated with a microblogging web service.

7. The method of claim 1, wherein the messaging strategy comprises an advertisement generation option.

8. The method of claim 1, wherein the messaging strategy comprises an advertisement target option.

9. The method of claim 8, wherein the advertisement target option comprises an advertisement target template.

10. The method of claim 9, wherein initiating the messaging strategy comprises automatically populating the advertisement target template.

11. The method of claim 9, further comprising:
    placing the strategic advertisement according to values populating the advertisement target template.

12. The method of claim 1, further comprising:
    receiving advertisement feedback in association with the messaging strategy; and
    storing the advertisement feedback in association with the messaging strategy.

13. The method of claim 12, further comprising:
    updating the messaging strategy based on the advertisement feedback.

14. The method of claim 12, wherein the advertisement feedback comprises user comments or user ratings.

15. The method of claim 12, wherein the advertisement feedback comprises a measure of user interactions with the marketing strategy.

16. The method of claim 15, wherein the measure of user interactions comprises click-through rates.

17. The method of claim 15, wherein the measure of user interactions comprises purchase consummations.

18. The method of claim 1, wherein initiating the messaging strategy further comprises:
    providing at least one marketing strategy recommendation for display to a user.

19. The method of claim 18, wherein the at least one marketing strategy recommendation is selectable.

20. The method of claim 19, further comprising:
    receiving selection of the at least one marketing strategy recommendation; and
    initiating the marketing strategy automatically based on the selection.

21. The method of claim 19, further comprising:
    determining a marketing strategy price; and
    providing the marketing strategy price for display in association with the selectable marketing strategy recommendation.

22. The method of claim 21, further comprising:
    charging the marketing strategy price associated with the selection of the at least one marketing strategy recommendation.

23. The method of claim 1, further comprising:
selecting at least one advertisement placement template based on the target group, wherein the advertisement placement template comprises a plurality of placement fields directing advertising placement.

24. The method of claim 23, wherein the advertisement placement template comprises a universal resource locator field, an inventory target category field, a demographic characteristics field, and a geographic characteristics field.

25. A system, comprising:
a memory; and
a processor disposed in communication with the memory and configured to issue processing instructions stored in the memory, the instructions comprising:
   determine a revenue lift elasticity by measuring a statistical correlation between at least one intent driver associated with a document corpus and at least one product revenue;
   identify a target group for advertisement having the revenue lift elasticity higher than a threshold elasticity value;
   select at least one target intent driver associated with the target group based on correlations between the at least one intent driver and the target group identified in a document corpus;
   determine a messaging strategy based on the at least one intent driver; and
   initiate the messaging strategy, including
      select an advertisement configuration template, configured as at least one markup language file, based on a comparison of template metadata tags to the at least one target intent driver;
      select advertising content data based on the at least one target intent driver; and
      automatically populate the advertisement generation template with the advertising content data.

26. A processor-readable non-transitory medium storing processor-issuable instructions, the instructions comprising:
   determine a revenue lift elasticity by measuring a statistical correlation between at least one intent driver associated with a document corpus and at least one product revenue;
   identify a target group for advertisement having the revenue lift elasticity higher than a threshold elasticity value;
   select at least one target intent driver associated with the target group based on correlations between the intent driver and the target group identified in a document corpus;
   determine a messaging strategy based on the at least one intent driver; and
   initiate the messaging strategy, including
      select an advertisement configuration template, configured as at least one markup language file, based on a comparison of template metadata tags to the at least one target intent driver;
      select advertising content data based on the at least one target intent driver; and
      automatically populate the advertisement generation template with the advertising content data.

* * * * *